US012785787B2

(12) United States Patent
Miao et al.

(10) Patent No.: US 12,785,787 B2
(45) Date of Patent: Nov. 3, 2026

(54) BEAM DETERMINATION METHOD, DEVICE, AND STORAGE MEDIUM

(71) Applicant: ZTE Corporation, Shenzhen (CN)

(72) Inventors: Ting Miao, Shenzhen (CN); Weimin Xing, Shenzhen (CN); Youxiong Lu, Shenzhen (CN); Feng Bi, Shenzhen (CN); Jie Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 217 days.

(21) Appl. No.: 18/699,627

(22) PCT Filed: Sep. 28, 2022

(86) PCT No.: PCT/CN2022/122076

§ 371 (c)(1),
(2) Date: Apr. 9, 2024

(87) PCT Pub. No.: WO2023/056864

PCT Pub. Date: Apr. 13, 2023

(65) Prior Publication Data

US 2024/0405846 A1 Dec. 5, 2024

(30) Foreign Application Priority Data

Oct. 9, 2021 (CN) .......................... 202111176629.8

(51) Int. Cl.
*H04B 7/08* (2006.01)
*H04B 7/06* (2006.01)
(Continued)

(52) U.S. Cl.
CPC ......... *H04B 7/088* (2013.01); *H04B 7/18539* (2013.01); *H04W 16/28* (2013.01)

(58) Field of Classification Search
CPC ........................ H04W 24/00-04; H04W 24/10
See application file for complete search history.

(56) References Cited

U.S. PATENT DOCUMENTS

2020/0092846 A1 3/2020 Deng et al.
2020/0366363 A1* 11/2020 Li ......................... H04W 24/10
(Continued)

FOREIGN PATENT DOCUMENTS

CN 108365939 A 8/2018
CN 110099021 A 8/2019
(Continued)

OTHER PUBLICATIONS

InterDigital, Inc., Remaining issues on beam management, 3GPP TSG RAN WG1 Meeting #91, Reno, USA, Nov. 27-Dec. 1, 2017 , R1-1720630.
(Continued)

*Primary Examiner* — San Htun
(74) *Attorney, Agent, or Firm* — CANTOR COLBURN LLP

(57) ABSTRACT

A bean determination method applied to a first communication node includes: receiving configuration information sent by a second communication node; and determining, according to the configuration information, a beam used by the first communication node, where the configuration information includes at least one of the following: first configuration information, second configuration information, or third configuration information.

8 Claims, 8 Drawing Sheets

(51) Int. Cl.
*H04B 7/185* (2006.01)
*H04W 16/28* (2009.01)

(56) References Cited

U.S. PATENT DOCUMENTS

| | | | | |
|---|---|---|---|---|
| 2020/0403689 | A1* | 12/2020 | Rofougaran ....... | H04B 7/15514 |
| 2021/0044412 | A1 | 2/2021 | Li et al. | |
| 2021/0067237 | A1 | 3/2021 | Sampath et al. | |
| 2022/0069868 | A1* | 3/2022 | Abedini ............... | H04B 7/0695 |
| 2022/0069893 | A1* | 3/2022 | Abedini ............. | H04B 7/15507 |

FOREIGN PATENT DOCUMENTS

| | | | |
|---|---|---|---|
| CN | 110249573 | A | 9/2019 |
| CN | 111066370 | A | 4/2020 |
| CN | 111373667 | A | 7/2020 |
| CN | 112543443 | A | 3/2021 |
| CN | 112753169 | A | 5/2021 |
| JP | 2020072477 | A | 5/2020 |
| WO | 2021026561 | A1 | 2/2021 |

OTHER PUBLICATIONS

International Search Report for corresponding application PCT/CN2022/122076 filed Sep. 28, 2022; Mail date Nov. 25, 2022.
LG Electronics, Discussion on DL and UL beam management, 3GPP TSG RAN WG1 NR Ad Hoc Meeting R1-1700470 Spokane, USA Jan. 16-20, 2017.
Japanese Office Action for corresponding application Japanese Patent Application No. 2024-521315; Mail date Feb. 20, 2025.
European Search Report for Application No. 22877883.3, dated Sep. 24, 2025, 11 pages.
Korean Office Action; Application No. 10-2024-7014949; Filing Date: May 3, 2024; date of mailing: Oct. 30, 2025; 10 pages.

* cited by examiner

BEAM DETERMINATION METHOD, DEVICE, AND STORAGE MEDIUM

CROSS-REFERENCE TO RELATED APPLICATION(S)

This is a national stage application filed under 35 U.S.C. 371 based on International Patent Application NO. PCT/CN2022/122076, filed Sep. 28, 2022, which claims priority to Chinese Patent Application No. 202111176629.8 filed with the China National Intellectual Property Administration (CNIPA) on Oct. 9, 2021, the disclosures of which are incorporated herein by reference in its entirety.

TECHNICAL FIELD

The present disclosure relates to the field of communications, for example, a beam determination method, a device, and a storage medium.

BACKGROUND

In high-frequency scenarios, a smart repeater may perform configuration using time division duplexing (TDD) to amplify and forward uplink and downlink transmissions between a base station and user equipment (UE) in a time-division manner. In addition, the base station may provide some control information (such as beam configuration information) for the smart repeater so that the terminal can determine the beam used for forwarding to implement the forwarding operation of the smart repeater. However, how the smart repeater determines the beam to use according to the beam configuration information is a technical problem that needs to be solved.

SUMMARY

The present disclosure provides a beam determination method. The method is applied to a first communication node and includes the following.

Configuration information sent by a second communication node is received; and a beam used by the first communication node is determined according to the configuration information. The configuration information includes at least one of the following: first configuration information, second configuration information, or third configuration information.

The present disclosure provides a beam determination method. The method is applied to a second communication node and includes the following.

Configuration information is determined; and the configuration information is sent to a first communication node so that the first communication node determines, according to the configuration information, a beam to use. The configuration information includes at least one of the following: first configuration information, second configuration information, or third configuration information.

The present disclosure provides a communication device. The communication device includes a communication module, a memory, and at least one processor. The communication module is configured to perform a communicative interaction between a first communication node and a second communication node; the memory is configured to store at least one program; and when executed by the at least one processor, the at least one program causes the at least one processor to perform the beam determination method.

The present disclosure provides a storage medium, which is configured to store a computer program. The computer program, when executed by a processor, causes the processor to perform the beam determination method.

DETAILED DESCRIPTION

Figure 1:
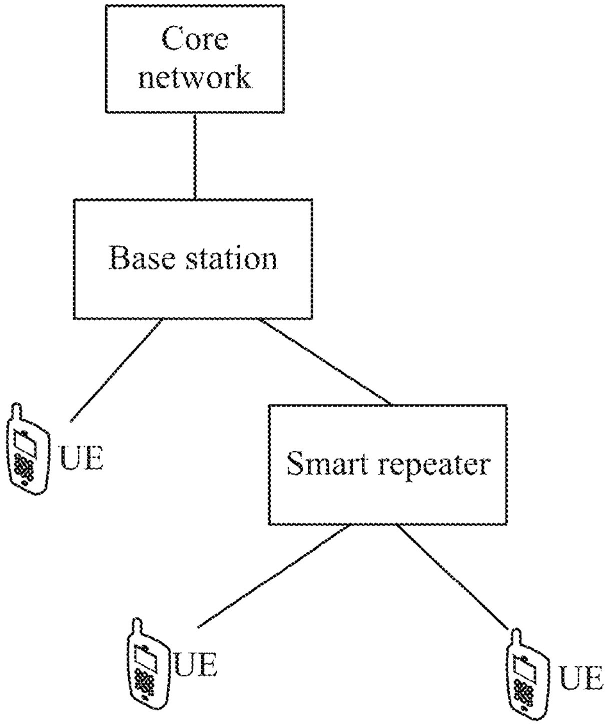
FIG. 1 is a schematic diagram of communications of a smart repeater.

Embodiments of the present disclosure are described hereinafter in conjunction with the drawings. The present disclosure is described hereinafter in conjunction with the embodiments and the drawings. The examples listed hereinafter are intended to explain the present disclosure and not to limit the scope of the present disclosure.

Coverage is essential to the deployment of a cellular network. Generally, full network coverage can be achieved by using different types of network nodes, such as a base station, an integrated access and backhaul (IAB) node, and a radio frequency (RF) repeater.

New Radio (NR) may use a higher frequency. Generally, a high-frequency channel has the disadvantages of a relatively large free propagation loss, being easily absorbed by oxygen, being greatly affected by rain fade, and the like, which severely affect the coverage performance of a high-frequency communication system and aggravate a coverage challenge. In addition to the use of analog beamforming technology to enlarge a coverage range, the IAB node is introduced into the NR, the IAB node is a relay node in the NR, and access and backhaul are supported through the NR. A terminating node on a network side is a donor IAB, and all IAB nodes are connected to the donor IAB through one hop or multiple hops. The donor IAB is a next-generation NodeB (gNB) that supports IAB functions, and the gNB is a base station of the NR and generally includes one central unit (CU) and at least one distributed unit (DU). The IAB node is introduced so that NR cells can be flexibly and densely deployed without laying a large number of optical fibers, thereby saving network deployment costs and enlarging a network coverage range. An IAB node that supports some functions of a UE may be referred to as an IAB-MT, and the IAB-MT is wirelessly connected to a higher-level node (or referred to as a parent node) to implement backhaul. An IAB node that supports the function of gNB-DU at the same time is referred to as an IAB-DU, which may serve a common UE and IAB node (or referred to as a child node). The IAB node is a regenerative type of relay, and each data packet forwarded by the IAB node is correctly decoded and re-encoded by the IAB node to be transmitted to a next-hop node or a terminal.

A repeater has been used in the deployment of the 2nd generation mobile communication technology (2G), 3G, and 4G, which is a device for receiving, amplifying, and transmitting data in a downlink direction (from a base station to a terminal) and an uplink direction (from the terminal to the base station). The repeater can supplement network coverage and enhance the coverage capability of a network and is the simplest and most cost-effective method for improving a network coverage rate. The repeater has the advantages of low cost, easy deployment, and no increase in delay and the disadvantage of simultaneously amplifying a useful signal and noise, which may increase interference (pollution) in a system. The RF repeater is a non-regenerative type of relay, which simply amplifies and sends all of the received data. The RF repeater is generally a full-duplex node, which is not distinguished between uplink and downlink from the perspective of sending or receiving.

In NR deployment, a TDD manner may be used so that amplifying-and-forwarding in bidirectional directions at the same time may not be required, which can reduce the pollution of a common repeater. The analog beamforming technology is used for performing transmission for a single user, which can extend coverage, especially at a high frequency. However, a common repeater that is not known to a network may fail to obtain a beam gain. Therefore, a smart repeater between the common repeater and the IAB node is a better choice. FIG. 1 is a schematic diagram of communications of a smart repeater. In the downlink direction (that is, from the base station to the terminal UE) and the uplink direction, the smart repeater receives, amplifies, and sends radiated or conducted RF carriers. On the downlink, the smart repeater receives data from the base station and amplifies and sends the data to the UE. On the uplink, the smart repeater receives data from the UE and amplifies and sends the data to the base station. A process of the smart repeater receiving, amplifying, and sending data transmitted between the base station and the UE is referred to as amplify-and-forward. The base station can provide some side control information for the smart repeater, such as configuration information (also referred to as beam configuration information). According to the beam configuration information, the beam used for amplify-and-forward can be determined to implement intelligent amplify-and-forward operations. However, how the base station provides the configuration information for the smart repeater and how the smart repeater determines the beam to use are technical problems that need to be solved.

In view of this, an embodiment of the present disclosure provides a beam determination method so that a first communication node determines the beam to use.

Figure 2:
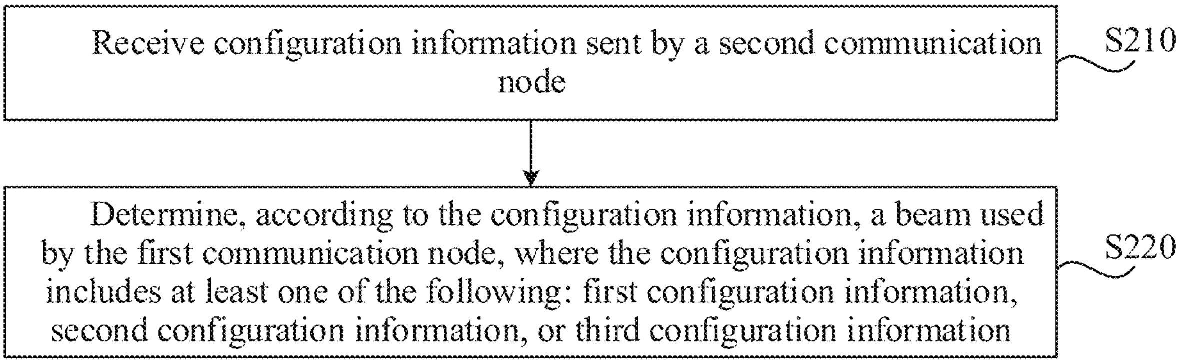
FIG. 2 is a flowchart of a beam determination method according to an embodiment of the present disclosure.

In an embodiment, FIG. 2 is a flowchart of a beam determination method according to an embodiment of the present disclosure. This embodiment may be implemented by a communication device. The communication device may be the first communication node. For example, the first communication node may be a node with functions of receiving, amplifying, and transmitting, such as the smart repeater or a relay station; or a node with functions of receiving, decoding, re-encoding, and forwarding; or a node with functions of receiving, partially decoding, re-encoding, and forwarding. As shown in FIG. 2, this embodiment includes S210 and S220.

In S210, configuration information sent by a second communication node is received.

In S220, a beam used by the first communication node is determined according to the configuration information, where the configuration information includes at least one of the following: first configuration information, second configuration information, or third configuration information.

In an embodiment, the first communication node receives at least one of the first configuration information, the second configuration information, or the third configuration information sent by the second communication node, and the beam used by the first communication node on a target time resource is determined according to at least one of the three pieces of configuration information so that the first communication node determines the beam.

In an embodiment, the step in which the beam used by the first communication node on the target time resource is determined according to the configuration information includes at least one of the following: determining the beam used on the target time resource according to beam information corresponding to a time unit indicated by the configuration information and a time unit where the target time resource is located; or determining the beam used on the target time resource according to beam information corresponding to a resource group indicated by the configuration information and a resource group where the target time resource is located.

In an embodiment, the first configuration information includes beam information corresponding to each time unit within a configuration period; or the first configuration information includes beam information corresponding to some time units within a configuration period. In an embodiment, the case where the first communication node determines the beam to use in a time unit according to the first configuration information may be understood as that the second communication node provides periodic or semi-static beam configuration information for the first communication node. In an embodiment, the first configuration information is configured to indicate the beam information corresponding to the time unit within the configuration period, where the granularity of the indication includes one of the following: using the resource type of the time unit as the granularity or using the time unit as the granularity. In an embodiment, the resource type includes at least one of the following: uplink, downlink, or flexible. In an embodiment, for a flexible (F) symbol within the time unit, the first communication node defaults to not performing amplify-and-forward on the F symbol. In an embodiment, one time unit may correspond to one or more beams, which is not limited. The time unit may include a radio frame, a sub-frame, a slot, an integer multiple of a slot, a symbol, and an integer multiple of a symbol. In an embodiment, assuming that the configuration period includes N time units, the first configuration information includes beam information corresponding to each of the N time units in the configuration period, that is, the first configuration information includes beam information corresponding to the first time unit; beam information corresponding to the second time unit; . . . and the beam information corresponding to the N-th time unit. In an embodiment, assuming that the configuration period includes N time units, the first configuration information includes at least one time unit in the configuration period and beam information corresponding to each of the at least one time unit. In an embodiment, for one time unit or symbol, if the first configuration information does not indicate beam information corresponding to the time unit or symbol, the first communication node uses an omnidirectional beam by default or does not perform amplify-and-forward on the time unit or symbol.

In an embodiment, the beam information includes at least one of the following: a downlink (DL) transmit beam corresponding to a DL symbol; a DL receive beam corresponding to a DL symbol; an uplink (UL) transmit beam corresponding to a UL symbol; a UL receive beam corresponding to a UL symbol; a beam corresponding to an F symbol; or a transmit beam of the second communication node.

In an embodiment, for one time unit, the DL transmit beam corresponding to the DL symbol is configured to indicate a transmit beam used by the first communication node on a first link on the DL symbol within the time unit. For one time unit, the UL receive beam corresponding to the UL symbol is configured to indicate a receive beam used by the first communication node on the first link on the UL symbol within the time unit. For one time unit, the beam corresponding to the F symbol is configured to indicate at least one of the following: a DL transmit beam used by the first communication node on the first link on the F symbol within the time unit; a UL receive beam used by the first communication node on the first link on the F symbol within the time unit; a DL receive beam used by the first communication node on a second link on the F symbol within the time unit; or a UL transmit beam used by the first communication node on the second link on the F symbol within the time unit. For one time unit, the DL receive beam corresponding to the DL symbol is configured to indicate a receive beam used by the first communication node on the second link on the DL symbol within the time unit. For one time unit, the UL transmit beam corresponding to the UL symbol is configured to indicate a transmit beam used by the first communication node on the second link on the UL symbol within the time unit. For one time unit, the transmit beam of the second communication node is configured to indicate a DL receive beam and/or a UL transmit beam used by the first communication node on the second link within the time unit.

In an embodiment, the first link refers to a link between the first communication node and a third communication node; and the second link refers to a link between the second communication node and the first communication node. For example, the third communication node may be a terminal, an IAB node, a base station, or a relay node.

In an embodiment, the beam corresponding to the F symbol includes at least one of the following: a first transmit and receive beam; the first transmit and receive beam and a first F symbol group corresponding to the first transmit and receive beam; first transmit and receive indication information; a DL transmit beam and a second F symbol group corresponding to the DL transmit beam; a UL receive beam and a third F symbol group corresponding to the UL receive beam; a second transmit and receive beam; the second transmit and receive beam and a fourth F symbol group corresponding to the second transmit and receive beam; second transmit and receive indication information; a DL receive beam and a fifth F symbol group corresponding to the DL receive beam; a UL transmit beam and a sixth F symbol group corresponding to the UL transmit beam; a third transmit and receive beam; the third transmit and receive beam and a seventh F symbol group corresponding to the third transmit and receive beam; uplink and downlink transmit and receive indication information; a DL transmit beam, a DL receive beam, and an eighth F symbol group corresponding to the DL transmit beam and the DL receive beam; or a UL transmit beam, a UL receive beam, and a ninth F symbol group corresponding to the UL transmit beam and the UL receive beam. The first transmit and receive beam includes the DL transmit beam or the UL receive beam; the second transmit and receive beam includes the DL receive beam or the UL transmit beam; and the third transmit and receive beam includes the DL transmit beam and the DL receive beam or includes the UL transmit beam and the UL receive beam. In an embodiment, the first transmit and receive indication information is configured to indicate whether the first transmit and receive beam is the DL transmit beam or the UL receive beam. For example, for transmit and receive beam 1, if the first transmit and receive indication information is a0, transmit and receive beam 1 is the DL transmit beam; and if the first transmit and receive indication information is a1, transmit and receive beam 1 is the UL receive beam. a0 and a1 are two different values of the first transmit and receive indication information. In an embodiment, the second transmit and receive indication information is configured to indicate whether the second transmit and receive beam is the DL receive beam or the UL transmit beam. For example, for transmit and receive beam 1, if the second transmit and receive indication information is b0, transmit and receive beam 1 is the DL receive beam; and if the second transmit and receive indication information is b1, transmit and receive beam 1 is the UL transmit beam. b0 and b1 are two different values of the second transmit and receive indication information. In an embodiment, the uplink and downlink transmit and receive indication information is configured to indicate whether the third transmit and receive beam is the DL receive beam and the DL transmit beam or the UL receive beam and the UL transmit beam.

In an embodiment, for one time unit, in the case where the beam on the first link corresponding to a time domain resource is indicated according to the resource type, the beam information may include at least one of the following: the DL transmit beam corresponding to the DL symbol; the UL receive beam corresponding to the UL symbol; or the beam corresponding to the F symbol. For one time unit, the DL transmit beam corresponding to the DL symbol is configured to indicate a transmit beam used by the first communication node on the first link on the DL symbol within the time unit. For one time unit, the UL receive beam corresponding to the UL symbol is configured to indicate a receive beam used by the first communication node on the first link on the UL symbol within the time unit. For one time unit, the beam corresponding to the F symbol is configured to indicate at least one of the following: a DL transmit beam used by the first communication node on the first link on the F symbol within the time unit or a UL receive beam used by the first communication node on the first link on the F symbol within the time unit. In an embodiment, the beam corresponding to the F symbol may include one of the following: the first transmit and receive beam; the first transmit and receive beam and the corresponding first F symbol group; the first transmit and receive indication information; the DL transmit beam and the corresponding second F symbol group; or the UL receive beam and the corresponding third F symbol group. In an embodiment, for one time unit, the DL transmit beam and the corresponding second F symbol group are configured to indicate the DL transmit beam and on which F symbol or F symbols the first communication node uses the DL transmit beam on the first link within the time unit. For one time unit, the UL receive beam and the corresponding third F symbol group are configured to indicate the UL receive beam and on which F symbol or F symbols the first communication node uses the UL receive beam on the first link within the time unit. For one time unit, the first transmit and receive beam and the corresponding first F symbol group are configured to indicate the transmit and receive beam and on which F symbol or F symbols the first communication node uses the first transmit and receive beam on the first link within the time unit.

In an embodiment, for one time unit, in the case where the beam on the second link corresponding to a time domain resource is indicated according to the resource type, the beam information may include at least one of the following: the DL receive beam corresponding to the DL symbol; the UL transmit beam corresponding to the UL symbol; or the beam corresponding to the F symbol. For one time unit, the DL receive beam corresponding to the DL symbol is configured to indicate a receive beam used by the first communication node on the second link on the DL symbol within the time unit. For one time unit, the UL transmit beam corresponding to the UL symbol is configured to indicate a transmit beam used by the first communication node on the second link on the UL symbol within the time unit. For one time unit, the beam corresponding to the F symbol is configured to indicate at least one of the following: a DL receive beam used by the first communication node on the second link on the F symbol within the time unit or a UL transmit beam used by the first communication node on the second link on the F symbol within the time unit. In an embodiment, the beam corresponding to the F symbol may include one of the following: the second transmit and receive beam; the second transmit and receive beam and the corresponding fourth F symbol group; the second transmit and receive indication information; the DL receive beam and the corresponding fifth F symbol group; or the UL transmit beam and the corresponding sixth F symbol group. For one time unit, the second transmit and receive beam and the corresponding fourth F symbol group are configured to indicate the second transmit and receive beam and on which F symbol or F symbols the first communication node uses the second transmit and receive beam on the second link within the time unit. For one time unit, the DL receive beam and the corresponding fifth F symbol group are configured to indicate the DL receive beam and on which F symbol or F symbols the first communication node uses the DL receive beam on the second link within the time unit. For one time unit, the UL transmit beam and the corresponding sixth F symbol group are configured to indicate the UL transmit beam and on which F symbol or F symbols the first communication node uses the UL transmit beam on the second link within the time unit.

In an embodiment, for one time unit, in the case where the beams on the first link and the second link corresponding to the time domain resource are indicated according to the resource type, the beam information may include at least one of the following: the DL transmit beam corresponding to the DL symbol and the DL receive beam corresponding to the DL symbol; the UL transmit beam corresponding to the UL symbol and the UL receive beam corresponding to the UL symbol; or the beam corresponding to the F symbol. In an embodiment, the beam corresponding to the F symbol may include one of the following: the third transmit and receive beam; the third transmit and receive beam and the corresponding seventh F symbol group; the uplink and downlink transmit and receive indication information; the DL transmit beam, the DL receive beam, and the corresponding eighth F symbol group; or the UL receive beam, the UL receive beam, and the corresponding ninth F symbol group. For one time unit, the third transmit and receive beam and the corresponding F symbol group are configured to indicate the third transmit and receive beam and on which F symbol or F symbols the first communication node uses the third transmit and receive beam on the first link and the second link within the time unit. For one time unit, the DL receive beam, the DL transmit beam, and the corresponding eighth F symbol group within the time unit are configured to indicate the DL receive beam and the DL transmit beam, on which F symbol or F symbols the first communication node uses the DL receive beam on the second link within the time unit, and on which F symbol or F symbols the first communication node uses the DL transmit beam on the first link within the time unit. For one time unit, the UL receive beam, the UL transmit beam, and the corresponding ninth F symbol group within the time unit are configured to indicate the UL receive beam and the UL transmit beam, on which F symbol or F symbols the first communication node uses the UL receive beam on the first link within the time unit, and on which F symbol or F symbols the first communication node uses the UL transmit beam on the second link within the time unit.

In an embodiment, the second configuration information includes a resource group and beam information corresponding to the resource group. In an embodiment, the beam information corresponding to the resource group is indicated in at least one of the manners described below.

The resource group is used as the granularity to indicate the beam information; the resource set is used as the granularity to indicate the beam information, and one resource set corresponds to one piece of beam information; or the resource set is used as the granularity to indicate the beam information, and one resource group in the resource set corresponds to one piece of beam information; where the resource set includes at least one resource group. In an embodiment, the case where one resource set corresponds to one piece of beam information may be understood as that all the resource groups in the resource set correspond to one piece of beam information. In an embodiment, the resource group includes at least one of the following: a DL resource group or a UL resource group. Correspondingly, in an embodiment, the beam information corresponding to the DL resource group includes at least one of the following: a DL receive beam or a DL transmit beam. The DL receive beam includes one of the following: a receive beam of the first communication node on the second link or a transmit beam of the second communication node. The DL transmit beam includes a transmit beam of the first communication node on the first link. In an embodiment, the beam information corresponding to the UL resource group includes at least one of the following: a UL receive beam or a UL transmit beam. The UL receive beam includes a receive beam of the first communication node on the first link. The UL transmit beam includes one of the following: a transmit beam of the first communication node on the second link or the transmit beam of the second communication node.

In an embodiment, one resource group corresponds to one piece of beam information, where the beam information includes at least one of the following: a DL transmit beam, a DL receive beam, a UL transmit beam, a UL receive beam, or a transmit beam of the second communication node.

In an embodiment, the beam information corresponding to the resource group meets at least one of the following: one resource group corresponds to one piece of beam information; or all the resource groups in one resource set correspond to one piece of beam information.

In an embodiment, in the case where one resource group corresponds to one piece of beam information, the resource group is used as the granularity to indicate the beam information, or the resource set is used as the granularity to indicate the beam information; and in the case where all the resource groups in one resource set correspond to one piece of beam information, the resource set is used as the granularity to indicate the beam information.

In an embodiment, the third configuration information includes at least one of the following: a time unit identifier and beam information corresponding to the time unit identifier; a combination of beam information; a list of combinations of beam information; or combination indication information. The time unit identifier and the beam information corresponding to the time unit identifier include at least one time unit and the beam information corresponding to each of the at least one time unit. The combination of beam information indicates beam information corresponding to at least one time unit. The list of combinations of beam information includes at least one combination of beam information. The combination indication information is configured to indicate a combination index.

In an embodiment, each tuple (or element) of the combination of beam information indicates beam information corresponding to one time unit according to a resource type or a link.

In an embodiment, the beam information corresponding to the one time unit is indicated according to the resource type, and the beam information includes at least one of the following: a DL receive beam; a DL transmit beam; a UL receive beam; or a UL transmit beam.

In an embodiment, the beam information corresponding to the one time unit is indicated according to the link, and the beam information includes at least one of the following: a beam of the first communication node on the first link; a beam of the first communication node on the second link; or a transmit beam of the second communication node.

In an embodiment, the third configuration information further includes an offset of a time unit in which an indication is valid relative to a time unit in which a signaling is detected, the signaling bearing the time unit identifier and the beam information corresponding to the time unit identifier, the combination of beam information, or the combination indication information.

In an embodiment, the configuration information includes the first configuration information and the second configuration information; and if the first configuration information and the second configuration information indicate, for the same time resource, beam information corresponding to the first configuration information and beam information corresponding to the second configuration information respectively, the beam information indicated by the first configuration information is covered or modified using the beam information indicated by the second configuration information. In an embodiment, if the second configuration information and the first configuration information indicate corresponding beam information for the same time resource simultaneously, the beam information indicated by the second configuration information may cover the beam information indicated by the first configuration information.

In an embodiment, the configuration information includes the first configuration information and the third configuration information; and if the first configuration information and the third configuration information indicate, for the same time resource, beam information corresponding to the first configuration information and beam information corresponding to the third configuration information respectively, the beam information indicated by the first configuration information is covered or modified using the beam information indicated by the third configuration information. In an embodiment, if the third configuration information and the first configuration information indicate corresponding beam information for the same time resource simultaneously, the beam information indicated by the first configuration information may be covered or modified using the beam information indicated by the third configuration information.

In an embodiment, the configuration information includes the second configuration information and the third configuration information; and if the second configuration information and the third configuration information indicate corresponding beam information for the same time resource simultaneously, the beam information indicated by the third configuration information is invalid, that is, the time resource uses the beam information indicated by the second configuration information.

In an embodiment, the DL receive beam includes one of the following: a receive beam of the first communication node on the second link or the transmit beam of the second communication node. The DL transmit beam includes a transmit beam of the first communication node on the first link. The UL receive beam includes a receive beam of the first communication node on the first link. The UL transmit beam includes one of the following: a transmit beam of the first communication node on the second link or the transmit beam of the second communication node.

In an embodiment, the first communication node determines the transmit beam of the first communication node on the second link according to the transmit beam of the second communication node.

In an embodiment, the first communication node determines the receive beam of the first communication node on the second link according to the transmit beam of the second communication node.

Figure 3:
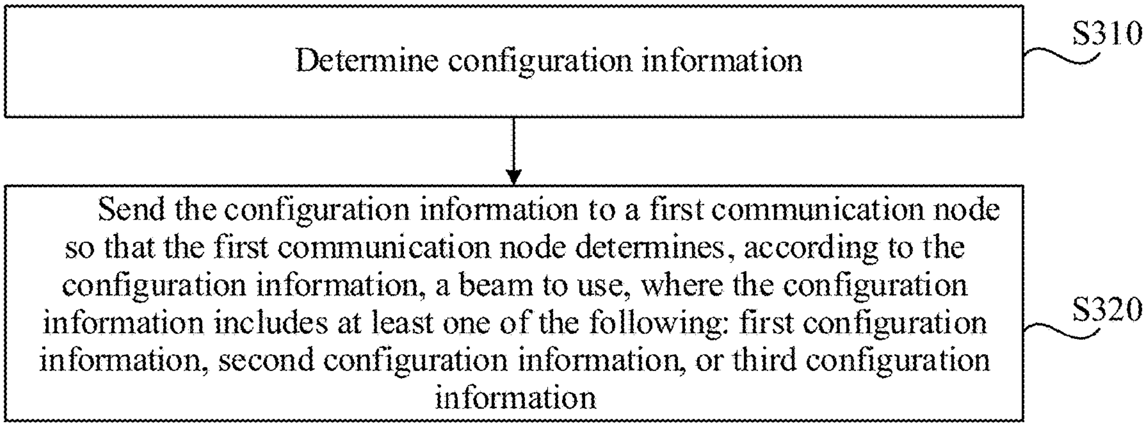
FIG. 3 is a flowchart of another beam determination method according to an embodiment of the present disclosure.

In an embodiment, FIG. 3 is a flowchart of another beam determination method according to an embodiment of the present disclosure. This embodiment may be implemented by a communication device. The communication device may be the second communication node. For example, the second communication node may be a base station, a relay node, an IAB node, or the like. As shown in FIG. 3, this embodiment includes S310 and S320.

In S310, configuration information is determined.

In S320, the configuration information is sent to a first communication node so that the first communication node determines, according to the configuration information, a beam to use, where the configuration information includes at least one of the following: first configuration information, second configuration information, or third configuration information.

In an embodiment, the first configuration information includes beam information corresponding to each time unit within a configuration period; or the first configuration information includes beam information corresponding to some time units within a configuration period.

In an embodiment, the beam information includes at least one of the following: a DL transmit beam corresponding to a DL symbol; a DL receive beam corresponding to a DL symbol; a UL transmit beam corresponding to a UL symbol; a UL receive beam corresponding to a UL symbol; a beam corresponding to an F symbol; or a transmit beam of the second communication node.

In an embodiment, for one time unit, the DL transmit beam corresponding to the DL symbol is configured to indicate a transmit beam used by the first communication node on a first link on the DL symbol within the time unit; for one time unit, the UL receive beam corresponding to the UL symbol is configured to indicate a receive beam used by the first communication node on the first link on the UL symbol within the time unit; for one time unit, the beam corresponding to the F symbol is configured to indicate at least one of the following: a DL transmit beam used by the first communication node on the first link on the F symbol within the time unit; a UL receive beam used by the first communication node on the first link on the F symbol within the time unit; a DL receive beam used by the first communication node on a second link on the F symbol within the time unit; or a UL transmit beam used by the first communication node on the second link on the F symbol within the time unit; for one time unit, the DL receive beam corresponding to the DL symbol is configured to indicate a receive beam used by the first communication node on the second link on the DL symbol within the time unit; for one time unit, the UL transmit beam corresponding to the UL symbol is configured to indicate a transmit beam used by the first communication node on the second link on the UL symbol within the time unit; and for one time unit, the transmit beam of the second communication node is configured to indicate a DL receive beam and/or a UL transmit beam used by the first communication node on the second link within the time unit.

In an embodiment, the beam corresponding to the F symbol includes at least one of the following: a first transmit and receive beam; the first transmit and receive beam and a first F symbol group corresponding to the first transmit and receive beam; first transmit and receive indication information; a DL transmit beam and a second F symbol group corresponding to the DL transmit beam; a UL receive beam and a third F symbol group corresponding to the UL receive beam; a second transmit and receive beam; the second transmit and receive beam and a fourth F symbol group corresponding to the second transmit and receive beam; second transmit and receive indication information; a DL receive beam and a fifth F symbol group corresponding to the DL receive beam; a UL transmit beam and a sixth F symbol group corresponding to the UL transmit beam; a third transmit and receive beam; the third transmit and receive beam and a seventh F symbol group corresponding to the third transmit and receive beam; uplink and downlink transmit and receive indication information; a DL transmit beam, a DL receive beam, and an eighth F symbol group corresponding to the DL transmit beam and the DL receive beam; or a UL transmit beam, a UL receive beam, and a ninth F symbol group corresponding to the UL transmit beam and the UL receive beam.

In an embodiment, the second configuration information includes a resource group and beam information corresponding to the resource group.

In an embodiment, one resource group corresponds to one piece of beam information, where the beam information includes at least one of the following: a DL transmit beam, a DL receive beam, a UL transmit beam, a UL receive beam, or a transmit beam of the second communication node.

In an embodiment, the beam information corresponding to the resource group meets at least one of the following: one resource group corresponds to one piece of beam information; or all the resource groups in one resource set correspond to one piece of beam information.

In an embodiment, the third configuration information includes at least one of the following: a time unit identifier and beam information corresponding to the time unit identifier; a combination of beam information; a list of combinations of beam information; or combination indication information. The time unit identifier and the beam information corresponding to the time unit identifier include at least one time unit and the beam information corresponding to each of the at least one time unit. The combination of beam information indicates beam information corresponding to at least one time unit; the list of combinations of beam information includes at least one combination of beam information; and the combination indication information is configured to indicate a combination index.

In an embodiment, each tuple (or element) of the combination of beam information indicates beam information corresponding to one time unit according to a resource type or a link.

In an embodiment, the beam information corresponding to the one time unit is indicated according to the resource type, and the beam information includes at least one of the following: a DL receive beam; a DL transmit beam; a UL receive beam; or a UL transmit beam.

In an embodiment, the beam information corresponding to the one time unit is indicated according to the link, and the beam information includes at least one of the following: a beam of the first communication node on the first link; a beam of the first communication node on the second link; or a transmit beam of the second communication node.

In an embodiment, the third configuration information further includes an offset of a time unit in which an indication is valid relative to a time unit in which a signaling is detected, the signaling bearing the time unit identifier and the beam information corresponding to the time unit identifier, the combination of beam information, or the combination indication information.

In an embodiment, the configuration information includes the first configuration information and the second configuration information; and if the first configuration information and the second configuration information indicate, for the same time resource, beam information corresponding to the first configuration information and beam information corresponding to the second configuration information respectively, the beam information indicated by the first configuration information is covered or modified using the beam information indicated by the second configuration information.

In an embodiment, the configuration information includes the first configuration information and the third configuration information; and if the first configuration information and the third configuration information indicate, for the same time resource, beam information corresponding to the first configuration information and beam information corresponding to the third configuration information respectively, the beam information indicated by the first configuration information is covered or modified using the beam information indicated by the third configuration information.

In an embodiment, the configuration information includes the second configuration information and the third configuration information; and if the second configuration information and the third configuration information indicate corresponding beam information for the same time resource simultaneously, the beam information indicated by the third configuration information is invalid, that is, the time resource uses the beam information indicated by the second configuration information.

In an embodiment, the DL receive beam includes one of the following: a receive beam of the first communication node on the second link or the transmit beam of the second communication node; the DL transmit beam includes a transmit beam of the first communication node on the first link; the UL receive beam includes a receive beam of the first communication node on the first link; and the UL transmit beam includes one of the following: a transmit beam of the first communication node on the second link or the transmit beam of the second communication node.

For the explanation of the parameters in the beam determination method applied to the second communication node, reference is made to the description of the corresponding parameters in the beam determination method applied to the first communication node in the preceding embodiment, and the details are not repeated one by one here.

In an embodiment, the case where the first communication node is a repeater and the second communication node is a base station is used as an example to describe the beam determination process using at least one piece of configuration information among the first configuration information, the second configuration information, and the third configuration information.

In an embodiment, the beam determination process is described by using the case where the base station periodically configures the beam usable by the repeater (that is, the configuration information is the first configuration information) as an example. In an embodiment, the case where the beam used by the repeater is determined by using the first configuration information may include four examples described below.

In example one, for one time unit, beam on the first link corresponding to the time unit is indicated according to the resource type.

The first configuration information includes the beam information corresponding to each of N time units in the configuration period, where N denotes the total number of time units included in the configuration period.

In an embodiment, the first configuration information is as follows: the beam information corresponding to the first time unit; the beam information corresponding to the second time unit; . . . and the beam information corresponding to the N-th time unit.

The beam information includes at least one of the following: a DL transmit beam corresponding to a DL symbol; a UL receive beam corresponding to a UL symbol; or the beam corresponding to an F symbol.

For one time unit, the DL transmit beam corresponding to the DL symbol is configured to indicate the DL transmit beam used by the repeater on the DL symbol on the first link within the time unit, that is, the beam used by the repeater when the repeater transmits transmissions to the terminal.

For one time unit, the UL receive beam corresponding to the UL symbol is configured to indicate the UL receive beam used by the repeater on the UL symbol on the first link within the time unit, that is, the beam used by the repeater when the repeater receives transmissions from the terminal.

For one time unit, the beam corresponding to the F symbol is configured to indicate at least one of the following: a DL transmit beam used by the repeater on the F symbol on the first link within the time unit or a UL receive beam used by the repeater on the F symbol on the first link within the time unit.

In an embodiment, the beam corresponding to the F symbol includes one of the following: the first transmit and receive beam; the first transmit and receive beam and the first F symbol group corresponding to the first transmit and receive beam; the first transmit and receive indication information and the first transmit and receive beam; the first transmit and receive indication information, the first transmit and receive beam, and the first F symbol group corresponding to the first transmit and receive beam; or the DL transmit beam, the second F symbol group corresponding to the DL transmit beam, the UL receive beam, and the third F symbol group corresponding to the UL receive beam.

For one time unit, the DL transmit beam and the corresponding second F symbol group are configured to indicate the DL transmit beam and on which F symbol or F symbols the repeater uses the DL transmit beam on the first link within the time unit.

For one time unit, the UL receive beam and the corresponding third F symbol group are configured to indicate the UL receive beam and on which F symbol or F symbols the repeater uses the UL receive beam on the first link within the time unit.

For one time unit, the first transmit and receive beam and the corresponding first F symbol group are configured to indicate the first transmit and receive beam and on which F symbol or F symbols the repeater uses the first transmit and receive beam on the first link within the time unit.

In an embodiment, the first transmit and receive indication information is configured to indicate whether the first transmit and receive beam is the DL transmit beam or the UL receive beam.

For example, for transmit and receive beam 1, if the first transmit and receive indication information is a0, transmit and receive beam 1 is the DL transmit beam; and if the first transmit and receive indication information is a1, transmit and receive beam 1 is the UL receive beam. a0 and a1 are two different values of the first transmit and receive indication information.

In an embodiment, whether the first transmit and receive beam is the DL transmit beam or the UL receive beam is determined through the identifier of the first transmit and receive beam. For example, the transmit beam (that is, the DL transmit beam) and the receive beam (that is, the UL receive beam) of the repeater on the first link use unified transmit and receive beam identifiers: 1 to L1, where 1 to M1 denote transmit beam identifiers, and M1+1 to L1 denote receive beam identifiers. According to the identifier of the first transmit and receive beam corresponding to the F symbol in the first configuration information, the repeater can determine whether the F symbol corresponds to the transmit beam or the receive beam.

The beam (or referred to as a spatial filter) is represented by one of the following: a beam identifier, a reference signal identifier, a transmission configuration indication (TCI) state, or a spatial relationship information identifier. Other beam indication methods are not excluded, and the present disclosure does not impose any restrictions on the beam indication methods.

In an embodiment, the F symbol group is configured to indicate a set of F symbols within the time unit. The time unit consists of one or more slots, and the F symbol group within the time unit consists of the F symbol groups in all slots within the time unit.

The F symbol group in a slot is indicated by at least one of the following: the starting F symbol and the number of F symbols in the slot, the starting F symbol and the ending F symbol in the slot, using a resource indication value (RIV) to indicate one or more consecutive F symbols in the slot, or using a bitmap to indicate the F symbols forming the F symbol group in the slot.

Figure 4:
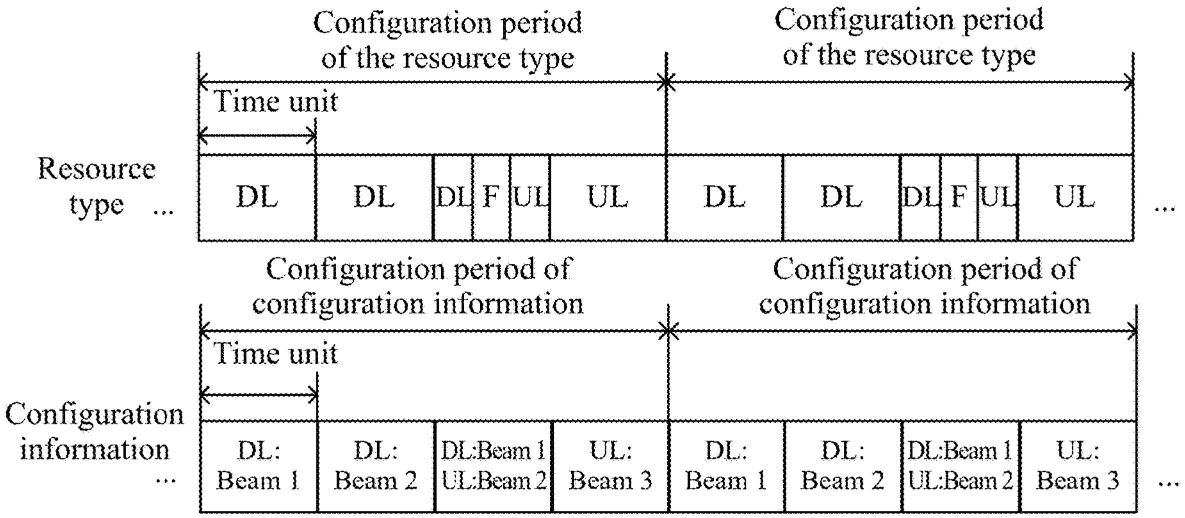
FIG. 4 is a schematic diagram of using first configuration information to determine beams to use according to an embodiment of the present disclosure.

FIG. 4 is a schematic diagram of using first configuration information to determine beams to use according to an embodiment of the present disclosure. As shown in FIG. 4, the case where the configuration period includes four time units is used as an example. If the DL transmit beams corresponding to the DL symbols in the first time unit and the second time unit are configured as DL beam 1 and DL beam 2, respectively, then in the first time unit and the second time unit, the DL transmit beams that the repeater determines to use are beam 1 and beam 2, respectively, that is, the repeater separately uses beam 1 and beam 2 for the transmission to the terminal. If in the third time unit, the DL transmit beam corresponding to the DL symbol and the UL receive beam corresponding to the UL symbol are configured as DL beam 1 and UL beam 2, respectively, the beam corresponding to the F symbol is not configured, and amplify-and-forward may not be performed on the F symbol by default, then in the third time unit, the DL transmit beam that the repeater determines to use on the DL symbol is beam 1 (that is, the repeater uses beam 1 on the DL symbol for the transmission to the terminal), the UL receive beam that the repeater determines to use on the UL symbol is beam 2 (that is, the repeater uses beam 2 on the UL symbol to receive the transmission from the terminal), and amplify-and-forward is not performed on the F symbol. If in the fourth time unit, the UL receive beam corresponding to the UL symbol is configured as UL beam 3, then in the fourth time unit, the UL receive beam that the repeater determines to use is beam 3, that is, the repeater uses beam 3 on the UL symbol to receive the transmission from the terminal.

Within one time unit, one resource type may correspond to one beam or multiple beams, which is not limited in the present disclosure. For example, the DL symbol may correspond to multiple DL transmit beams within the time unit, the UL symbol may correspond to multiple UL receive beams within the time unit, and the F symbol may correspond to multiple DL transmit beams and/or multiple UL receive beams within the time unit.

Similarly, one piece of time domain resource indicated by the configuration information may correspond to one beam or multiple beams in all the embodiments and examples described below. That is, the present disclosure does not limit the number of beams corresponding to one piece of time domain resource in the configuration information.

In example two, for one time unit, beam on the second link corresponding to the time unit is indicated according to the resource type.

In an embodiment, the first configuration information includes the beam information corresponding to each of M time units in the configuration period, where M denotes the total number of time units included in the configuration period.

In an embodiment, the configuration information is as follows: the beam information corresponding to the first time unit; the beam information corresponding to the second time unit; . . . and the beam information corresponding to the M-th time unit.

The beam information includes at least one of the following: the DL receive beam corresponding to the DL symbol; the UL transmit beam corresponding to the UL symbol; or the beam corresponding to the F symbol.

For one time unit, the DL receive beam corresponding to the DL symbol is configured to indicate the receive beam used by the repeater on the DL symbol on the second link within the time unit.

For one time unit, the UL transmit beam corresponding to the UL symbol is configured to indicate the transmit beam used by the repeater on the UL symbol on the second link within the time unit.

For one time unit, the beam information corresponding to the F symbol is configured to indicate at least one of the following: the DL receive beam used by the repeater on the F symbol on the second link within the time unit or the UL transmit beam used by the repeater on the F symbol on the second link within the time unit.

The beam corresponding to the F symbol includes one of the following: the second transmit and receive beam; the second transmit and receive beam and the corresponding fourth F symbol group; the second transmit and receive indication information and the second transmit and receive beam; the second transmit and receive indication information, the second transmit and receive beam, and the corresponding fourth F symbol group; or the DL receive beam, the corresponding fifth F symbol group, the UL transmit beam, and the corresponding sixth F symbol group.

For one time unit, the DL receive beam and the corresponding fifth F symbol group are configured to indicate the DL receive beam and on which F symbol or F symbols the repeater uses the DL receive beam on the second link within the time unit.

For one time unit, the UL transmit beam and the corresponding sixth F symbol group are configured to indicate the UL transmit beam and on which F symbol or F symbols the repeater uses the UL transmit beam on the second link within the time unit.

For one time unit, the second transmit and receive beam and the corresponding fourth F symbol group are configured to indicate the second transmit and receive beam and on which F symbol or F symbols the repeater uses the second transmit and receive beam on the second link within the time unit.

In an embodiment, the second transmit and receive indication information is configured to indicate whether the second transmit and receive beam is the DL receive beam or the UL transmit beam. For example, for transmit and receive beam 1, if the second transmit and receive indication information is b0, transmit and receive beam 1 is the DL receive beam; and if the second transmit and receive indication information is b1, transmit and receive beam 1 is the UL transmit beam. b0 and b1 are two different values of the second transmit and receive indication information.

In an embodiment, whether the second transmit and receive beam is the DL receive beam or the UL transmit beam is determined through the identifier of the second transmit and receive beam. For example, the receive beam (that is, the DL receive beam) and the transmit beam (that is, the UL transmit beam) of the repeater on the second link use unified beam identifiers: 1 to L2, where 1 to M2 denote receive beam identifiers, and M2+1 to L2 denote transmit beam identifiers. According to the beam identifier corresponding to the symbol in the first configuration information, the repeater can determine whether the symbol corresponds to the receive beam or the transmit beam; or according to the second transmit and receive indication information, the repeater can determine the beam corresponding to the F symbol in the time unit is the DL receive beam or the UL transmit beam.

The DL receive beam includes one of the following: the receive beam of the repeater on the second link or the transmit beam of the base station. The UL transmit beam includes one of the following: the transmit beam of the repeater on the second link or the transmit beam of the base station.

In an embodiment, if the DL receive beam includes the transmit beam of the base station, the repeater determines the receive beam of the repeater on the second link according to the transmit beam of the base station. For example, if the transmit beam of the base station is indicated by spatial relationship information, the receive beam used by the repeater is the spatial filter corresponding to the spatial relationship information, that is, on the second link, the repeater uses the spatial filter corresponding to the spatial relationship information for reception. For another example, if the transmit beam of the base station is indicated by the reference signal sent by the base station, the receive beam used by the repeater is the same as the receive beam for receiving the reference signal, that is, on the second link, the repeater uses the same spatial filter for receiving the reference signal for reception.

If the UL transmit beam includes the transmit beam of the base station, the repeater determines the transmit beam of the repeater on the second link according to the transmit beam of the base station. For example, if the transmit beam of the base station is indicated by spatial relationship information, the transmit beam used by the repeater is the spatial filter corresponding to the spatial relationship information, that is, the repeater uses the spatial filter corresponding to the spatial relationship information for transmission. For another example, if the transmit beam of the base station is indicated by the reference signal sent by the base station, the transmit beam used by the repeater is the same as the receive beam for receiving the reference signal, that is, the repeater uses the same spatial filter for receiving the reference signal for transmission.

Figure 5:
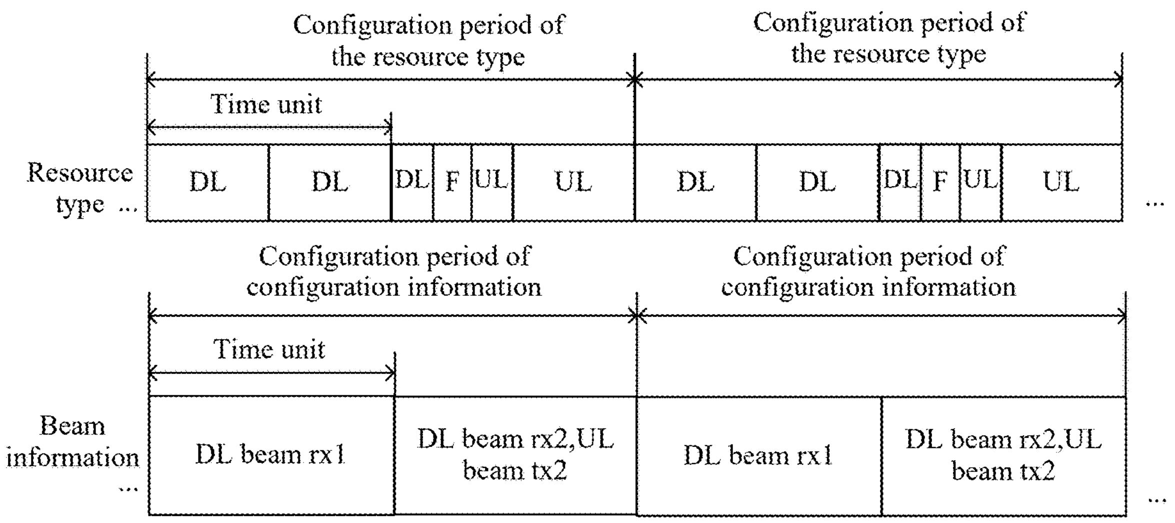
FIG. 5 is another schematic diagram of using first configuration information to determine beams to use according to an embodiment of the present disclosure.

FIG. 5 is another schematic diagram of using first configuration information to determine beams to use according to an embodiment of the present disclosure. As shown in FIG. 5, the case where the configuration period includes two time units and each time unit includes two slots is used as an example; if the DL receive beam corresponding to the DL symbol in the first time unit is configured as DL beam rx1, then in the first time unit, the DL receive beam the repeater determines to use is beam rx1, that is, the repeater uses beam rx1 to receive the transmission from the base station; if in the second time unit, the DL receive beam corresponding to the DL symbol is configured as DL beam rx2, the UL transmit beam corresponding to the UL symbol is configured as UL beam tx2, the beam corresponding to the F symbol is not configured, and it may be considered that the repeater does not perform amplify-and-forward on the F symbol, then in the second time unit, the DL receive beam the repeater determines to use on the DL symbol is beam rx2 (that is, the repeater uses beam rx2 on the DL symbol to receive the transmission from the base station), the transmit beam the repeater determines to use on the UL symbol is beam tx2 (that is, the repeater uses beam tx2 on the UL symbol for the transmission to the base station), and amplify-and-forward is not performed on the F symbol. That is, the DL receive beam indicates the receive beam used by the repeater when the repeater receives transmissions from the base station on the DL link; and the UL transmit beam indicates the transmit beam used by the repeater when the repeater transmits transmissions to the base station on the UL link.

In FIG. 5, for the DL symbol, the DL receive beam (for example, DL beam rx1) of the repeater is indicated, that is, the receive beam of the repeater on the second link is indicated. For the DL symbol, the transmit beam of the base station may also be indicated, and the repeater determines the DL receive beam of the repeater according to the transmit beam of the base station, that is, the repeater determines the receive beam of the repeater on the second link according to the transmit beam of the base station.

In FIG. 5, for the UL symbol, the UL transmit beam (for example, UL beam tx2) of the repeater is indicated, that is, the transmit beam of the repeater on the second link is indicated. For the UL symbol, the transmit beam of the base station may also be indicated, and the repeater determines the UL transmit beam of the repeater according to the transmit beam of the base station, that is, the repeater determines the transmit beam of the repeater on the second link according to the transmit beam of the base station.

In example three, for one time unit, beams on the first link and the second link corresponding to the time unit are indicated according to the resource type.

In an embodiment, the first configuration information includes the beam information corresponding to each of N time units in the configuration period, where N denotes the total number of time units included in the configuration period.

In an embodiment, the configuration information is as follows: the beam information corresponding to the first time unit; the beam information corresponding to the second time unit; . . . and the beam information corresponding to the N-th time unit.

The beam information includes at least one of the following: the DL receive beam and the DL transmit beam corresponding to the DL symbol; the UL receive beam and the UL transmit beam corresponding to the UL symbol; or the beam corresponding to the F symbol.

For one time unit, the DL receive beam and the DL transmit beam corresponding to the DL symbol are configured to indicate the receive beam used by the repeater on the DL symbol on the second link within the time unit and the transmit beam used by the repeater on the DL symbol on the first link within the time unit, respectively.

For one time unit, the UL receive beam and the UL transmit beam corresponding to the UL symbol are configured to indicate the receive beam used by the repeater on the UL symbol on the first link within the time unit and the transmit beam used by the repeater on the UL symbol on the second link within the time unit, respectively.

For one time unit, the beams corresponding to the F symbol are configured to indicate at least one of the following: the receive beam used by the repeater on the F symbol on the second link within the time unit and the transmit beam used by the repeater on the F symbol on the first link within the time unit, or the receive beam used by the repeater on the F symbol on the first link within the time unit and the transmit beam used by the repeater on the F symbol on the second link within the time unit.

The beam corresponding to the F symbol includes one of the following: the third transmit and receive beam; the third transmit and receive beam and the corresponding seventh F symbol group; uplink and downlink indication information and the third transmit and receive beam; the uplink and downlink indication information, the third transmit and receive beam, and the corresponding seventh F symbol group; or the DL receive beam, the DL transmit beam, the corresponding eighth F symbol group, the UL receive beam, the UL transmit beam, and the corresponding ninth F symbol group.

For one time unit, the DL receive beam, the DL transmit beam, and the corresponding eighth F symbol group within the time unit are configured to indicate the DL receive beam and the DL transmit beam, on which F symbol or F symbols the repeater uses the DL receive beam on the second link within the time unit, and on which F symbol or F symbols the repeater uses the DL transmit beam on the first link within the time unit.

For one time unit, the UL receive beam, the UL transmit beam, and the corresponding ninth F symbol group within the time unit are configured to indicate the UL receive beam and the UL transmit beam, on which F symbol or F symbols the repeater uses the UL receive beam on the first link within the time unit, and on which F symbol or F symbols the repeater uses the UL transmit beam on the second link within the time unit.

For one time unit, the third transmit and receive beam and the corresponding seventh F symbol group are configured to indicate the third transmit and receive beam and on which F symbol or F symbols the repeater uses the third transmit and receive beam on the first link and the second link within the time unit.

In an embodiment, the uplink and downlink indication information is configured to indicate whether the third transmit and receive beam is the DL receive beam and the DL transmit beam or the UL receive beam and the UL transmit beam.

The DL receive beam includes one of the following: the receive beam of the repeater on the second link or the transmit beam of the base station. The DL transmit beam includes a transmit beam of the repeater on the first link. The UL receive beam includes a receive beam of the repeater on the first link. The UL transmit beam includes one of the following: the transmit beam of the repeater on the second link or the transmit beam of the base station.

In an embodiment, if the DL receive beam includes the transmit beam of the base station, the repeater determines the receive beam of the repeater on the second link according to the transmit beam of the base station. For the determination method, reference may be made to the preceding examples, and the details are not repeated here.

If the UL transmit beam includes the transmit beam of the base station, the repeater determines the transmit beam of the repeater on the second link according to the transmit beam of the base station. For the determination method, reference may be made to the preceding examples, and the details are not repeated here.

Figure 6:
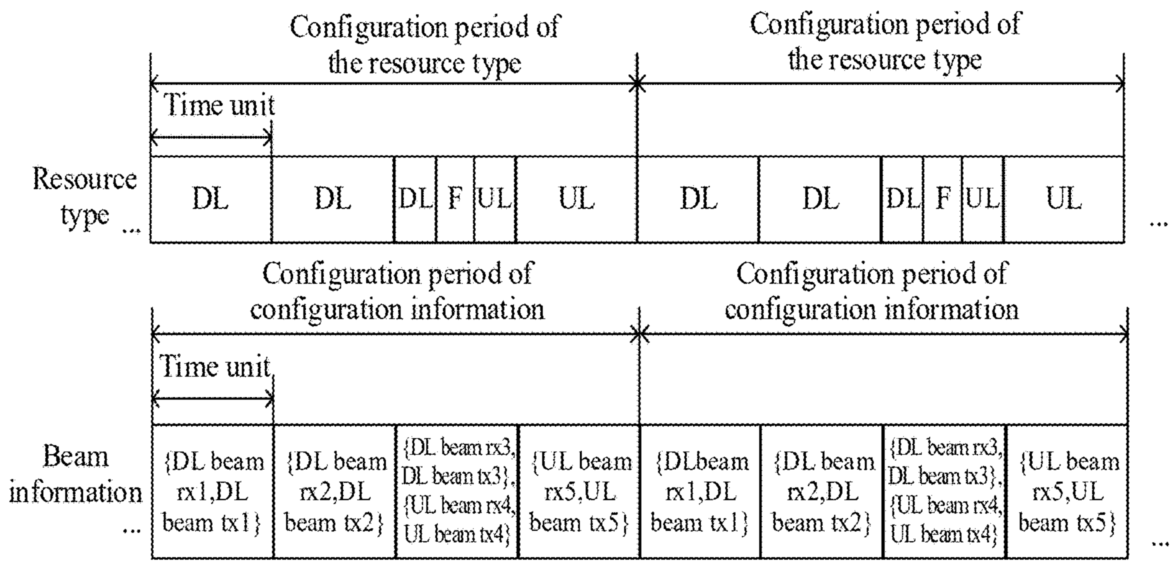
FIG. 6 is another schematic diagram of using first configuration information to determine beams to use according to an embodiment of the present disclosure.

FIG. 6 is another schematic diagram of using first configuration information to determine beams to use according to an embodiment of the present disclosure. As shown in FIG. 6, the case where the configuration period includes four time units is used as an example; if the DL receive beam and the DL transmit beam corresponding to the DL symbol in the first time unit are configured as {DL beam rx1, DL beam tx1}, then in the first time unit, the DL receive beam and the DL transmit beam the repeater determines to use are beam rx1 and beam tx1, respectively, that is, the repeater uses beam rx1 to receive the transmission from the base station and uses beam tx1 for the transmission to the terminal; if the DL receive beam and the DL transmit beam corresponding to the DL symbol in the second time unit are configured as {DL beam rx2, DL beam tx2}, then in the second time unit, the DL receive beam and the DL transmit beam the repeater determines to use are beam rx2 and beam tx2, respectively, that is, the repeater uses beam rx2 to receive the transmission from the base station and uses beam tx2 for the transmission to the terminal; if the DL receive beam and the DL transmit beam corresponding to the DL symbol in the third time unit are configured as {DL beam rx3, DL beam tx3}, the UL receive beam and the UL transmit beam corresponding to the UL symbol are configured as {UL beam rx4, UL beam tx4}, the beam corresponding to the F symbol is not configured, and it may be considered that the repeater does not perform amplify-and-forward on the F symbol in the third time unit, then in the third time unit, the DL receive beam and the DL transmit beam the repeater determines to use are beam rx3 and beam tx3, respectively (that is, on the DL symbol, the repeater uses beam rx3 to receive the transmission from the base station and uses beam tx3 for the transmission to the terminal), the UL receive beam and the UL transmit beam the repeater determines to use are beam rx4 and beam tx4, respectively (that is, on the UL symbol, the repeater uses beam rx4 to receive the transmission from the terminal and uses beam tx4 for the transmission to the base station), and amplify-and-forward is not performed on the F symbol; if the UL receive beam and the UL transmit beam corresponding to the UL symbol in the fourth time unit are configured as {UL beam rx5, UL beam tx5}, then in the fourth time unit, the UL receive beam and the UL transmit beam the repeater determines to use are beam rx5 and beam tx5, respectively, that is, on the UL symbol, the repeater uses beam rx5 to receive the transmission from the terminal and uses beam tx5 for the transmission to the base station. That is, the DL receive beam and the DL transmit beam indicate the receive beam and the transmit beam used by the repeater when the repeater receives, amplifies, and forwards the transmission from the base station to the terminal on the DL link. That is, the UL receive beam and the UL transmit beam indicate the receive beam and the transmit beam used by the repeater when the repeater receives, amplifies, and forwards the transmission from the terminal to the base station on the UL link.

In FIG. 6, for the DL symbol, the DL receive beam (for example, DL beam rx1) of the repeater is indicated, that is, the receive beam of the repeater on the second link is indicated. For the DL symbol, the transmit beam of the base station may also be indicated, and the repeater determines the DL receive beam of the repeater according to the transmit beam of the base station, that is, the repeater determines the receive beam of the repeater on the second link according to the transmit beam of the base station.

In FIG. 6, for the UL symbol, the UL transmit beam (for example, UL beam tx4) of the repeater is indicated, that is, the transmit beam of the repeater on the second link is indicated. For the UL symbol, the transmit beam of the base station may also be indicated, and the repeater determines the UL transmit beam of the repeater according to the transmit beam of the base station, that is, the repeater determines the transmit beam of the repeater on the second link according to the transmit beam of the base station.

In example four, for one time unit, beams on the first link and/or the second link corresponding to the time unit are indicated according to the resource type.

In an embodiment, the first configuration information includes the beam information corresponding to each of N time units in the configuration period, where N denotes the total number of time units included in the configuration period.

In an embodiment, the first configuration information is as follows: the beam information corresponding to the first time unit; the beam information corresponding to the second time unit; . . . and the beam information corresponding to the N-th time unit.

The beam information includes at least one of the following: the beam of the repeater on the first link, the beam of the repeater on the second link, or the transmit beam of the base station.

For one time unit, the beam of the repeater on the first link is configured to indicate the receive beam and the transmit beam used by the repeater on the first link within the time unit. For example, one beam in the beam information is both the transmit beam and the receive beam, that is, the repeater uses the same beam for the transmission to the terminal and the reception from the terminal. If the time unit includes the DL symbol, the beam of the repeater on the first link indicates the transmit beam used by the repeater on the DL symbol; if the time unit includes the UL symbol, the beam of the repeater on the first link indicates the receive beam used by the repeater on the UL symbol; and if the time unit includes the DL symbol and the UL symbol, the beam of the repeater on the first link indicates both the transmit beam used by the repeater on the DL symbol and the receive beam used by the repeater on the UL symbol.

For one time unit, the beam of the repeater on the second link or the transmit beam of the base station is configured to indicate the receive beam and the transmit beam used by the repeater on the second link within the time unit. For example, one beam in the beam information is both the transmit beam and the receive beam, that is, the repeater uses the same beam for the reception from the base station and the transmission to the base station. If the time unit includes the DL symbol, the beam of the repeater on the second link or the transmit beam of the base station indicates the receive beam used on the DL symbol; if the time unit includes the UL symbol, the beam of the repeater on the second link or the transmit beam of the base station indicates the transmit beam used on the UL symbol; and if the time unit includes the DL symbol and the UL symbol, the beam of the repeater on the second link or the transmit beam of the base station indicates both the receive beam used on the DL symbol and the transmit beam used on the UL symbol.

The repeater determines the receive beam and the transmit beam used by the repeater on the second link according to the transmit beam of the base station. For example, if the transmit beam of the base station is indicated by spatial relationship information, the beam (including the receive beam and the transmit beam) used by the repeater is the spatial filter corresponding to the spatial relationship information, that is, on the second link, the repeater uses the spatial filter corresponding to the spatial relationship information for reception and transmission. For another example, if the transmit beam of the base station is indicated by the reference signal sent by the base station, the beam (including the receive beam and the transmit beam) used by the repeater is the same as the receive beam for receiving the reference signal, that is, on the second link, the repeater uses the same spatial filter that receives the reference signal for reception and transmission.

In an embodiment, the first configuration information may include beam information corresponding to some time units within a configuration period. In an embodiment, the first configuration information includes at least one time unit within the configuration period and beam information corresponding to each of the at least one time unit within the configuration period. For the time unit indicated by the first configuration information, the beam determination method is the same as example one, example two, example three, or example four, and the details are not repeated one by one here.

Figure 7:
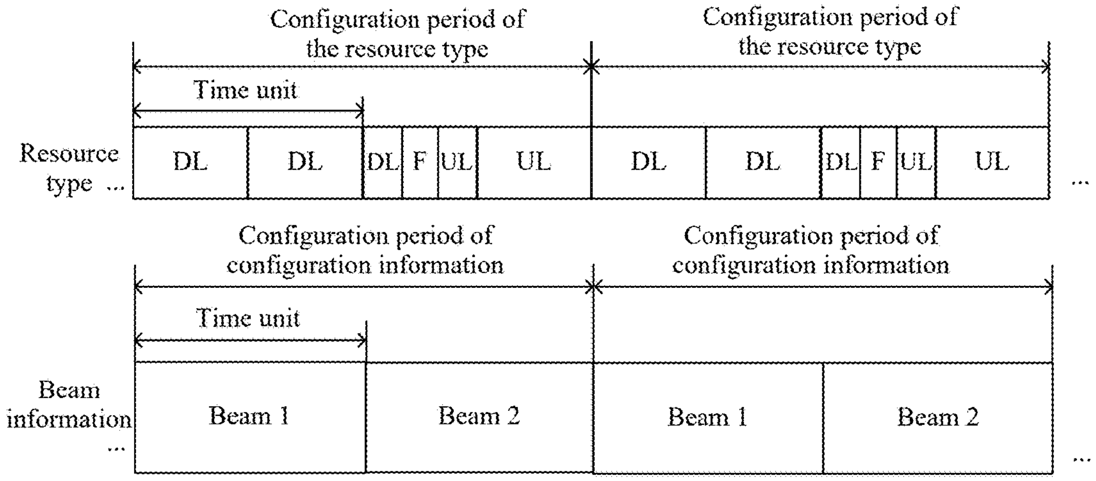
FIG. 7 is another schematic diagram of using first configuration information to determine beams to use according to an embodiment of the present disclosure.

FIG. 7 is another schematic diagram of using first configuration information to determine beams to use according to an embodiment of the present disclosure. As shown in FIG. 7, the case where the configuration period includes two time units and each time unit includes two slots is used as an example. If the beam of the repeater on the first link in the first time unit is configured as beam 1, then in the first time unit, the DL transmit beam the repeater determines to use is beam 1. If the beam of the repeater on the first link in the second time unit is configured as beam 2, the beam corresponding to the F symbol is not configured, and it may be considered that the repeater does not perform amplify-and-forward on the F symbol. Then in the second time unit, the DL transmit beam the repeater determines to use on the DL symbol is beam 2, and the receive beam the repeater determines to use on the UL symbol is also beam 2, that is, the repeater uses beam 2 on both the DL symbol and the UL symbol and does not perform amplify-and-forward on the F symbol. That is, for one time unit, the beam of the repeater on the first link is used as both the DL transmit beam and the UL receive beam.

In an embodiment, the beam determination process is described by using the case where the usable beam is configured on the specific resource (that is, the configuration information is the second configuration information) as an example. In an embodiment, the case where the beam used by the repeater is determined by using the second configuration information may include four examples described below.

In an embodiment, the repeater receives the second configuration information, the second configuration information includes the resource group and the beam information corresponding to the resource group, and the beam used on the resource group is determined according to the second configuration information.

The beam information corresponding to the resource group is indicated in at least one of the manners described below.

The resource group is used as the granularity to indicate the beam information; the resource set is used as the granularity to indicate the beam information, and one resource set corresponds to one piece of beam information, that is, all the resource groups in the resource set correspond to one piece of beam information.

The resource set is used as the granularity to indicate the beam information, and one resource group in the resource set corresponds to one piece of beam information.

The resource set includes one or more resource groups.

In an embodiment, the resource group includes at least one of the following: a DL resource group or a UL resource group.

In an embodiment, the beam information corresponding to the DL resource group includes at least one of the following: the DL receive beam or the DL transmit beam. The DL receive beam includes one of the following: the receive beam of the repeater on the second link or the transmit beam of the base station. The DL transmit beam includes the transmit beam of the repeater on the first link.

In an embodiment, the beam information corresponding to the UL resource group includes at least one of the following: the UL receive beam or the UL transmit beam. The UL receive beam includes the receive beam of the repeater on the first link. The UL transmit beam includes one of the following: the transmit beam of the repeater on the second link or the transmit beam of the base station.

In an embodiment, if the DL receive beam includes the transmit beam of the base station, the repeater determines the receive beam of the repeater on the second link according to the transmit beam of the base station. For the determination method, reference may be made to the description of the preceding examples, and the details are not repeated here.

If the UL transmit beam includes the transmit beam of the base station, the repeater determines the transmit beam of the repeater on the second link according to the transmit beam of the base station. For the determination method, reference may be made to the preceding examples, and the details are not repeated here.

In an embodiment, the beam information corresponding to the resource group includes at least one of the following: the beam of the repeater on the first link, the beam of the repeater on the second link, or the transmit beam of the base station.

For one resource group, the beam of the repeater on the first link is configured to indicate the receive beam and the transmit beam used by the repeater on the first link on the resource group.

For example, one beam in the beam information is both the transmit beam and the receive beam, that is, the repeater uses the same beam for the transmission to the terminal and the reception from the terminal. For the resource group including the DL symbol, the beam of the repeater on the first link indicates the transmit beam used on the resource group; and for the resource group including the UL symbol, the beam of the repeater on the first link indicates the receive beam used on the resource group.

For one resource group, the beam of the repeater on the second link or the transmit beam of the base station is configured to indicate the receive beam and the transmit beam used by the repeater on the second link on the resource group. For example, one beam in the beam information is both the transmit beam and the receive beam, that is, the repeater uses the same beam for the reception from the base station and the transmission to the base station. For the resource group including the DL symbol, the beam of the repeater on the second link or the transmit beam of the base station indicates the receive beam used on the resource group; and for the resource group including the UL symbol, the beam of the repeater on the second link or the transmit beam of the base station indicates the transmit beam used on the resource group.

The repeater does not expect one resource group to include both the DL symbol and the UL symbol.

In an embodiment, the beam information corresponding to the resource set includes at least one of the following: the beam of the repeater on the first link, the beam of the repeater on the second link, or the transmit beam of the base station.

For one resource set, the beam of the repeater on the first link is configured to indicate the receive beam and/or the transmit beam used by the repeater on the first link on all the resource groups in the resource set. For example, one beam in the beam information is both the transmit beam and the receive beam, and the repeater uses the same beam for the transmission to the terminal and the reception from the terminal. For the resource group including the DL symbol in the resource set, the beam of the repeater on the first link indicates the transmit beam used on the resource group; and for the resource group including the UL symbol in the resource set, the beam of the repeater on the first link indicates the receive beam used on the resource group.

For one resource set, the beam of the repeater on the second link or the transmit beam of the base station is configured to indicate the receive beam and/or the transmit beam used by the repeater on the second link on all the resource groups in the resource set. For example, one beam in the beam information is both the transmit beam and the receive beam, that is, the repeater uses the same beam for the reception from the base station and the transmission to the base station. For the resource group including the DL symbol in the resource set, the beam of the repeater on the second link or the transmit beam of the base station indicates the receive beam used on the resource group; and for the resource group including the UL symbol in the resource set, the beam of the repeater on the second link or the transmit beam of the base station indicates the transmit beam used on the resource group.

The repeater does not expect one resource group to include both the DL symbol and the UL symbol.

In an embodiment, the repeater determines the receive beam and the transmit beam used by the repeater on the second link according to the transmit beam of the base station. For the determination method, reference is made to example four in the preceding embodiment, and the details are not repeated here.

Example One: Resource Group Configuration Manners

Figure 8:
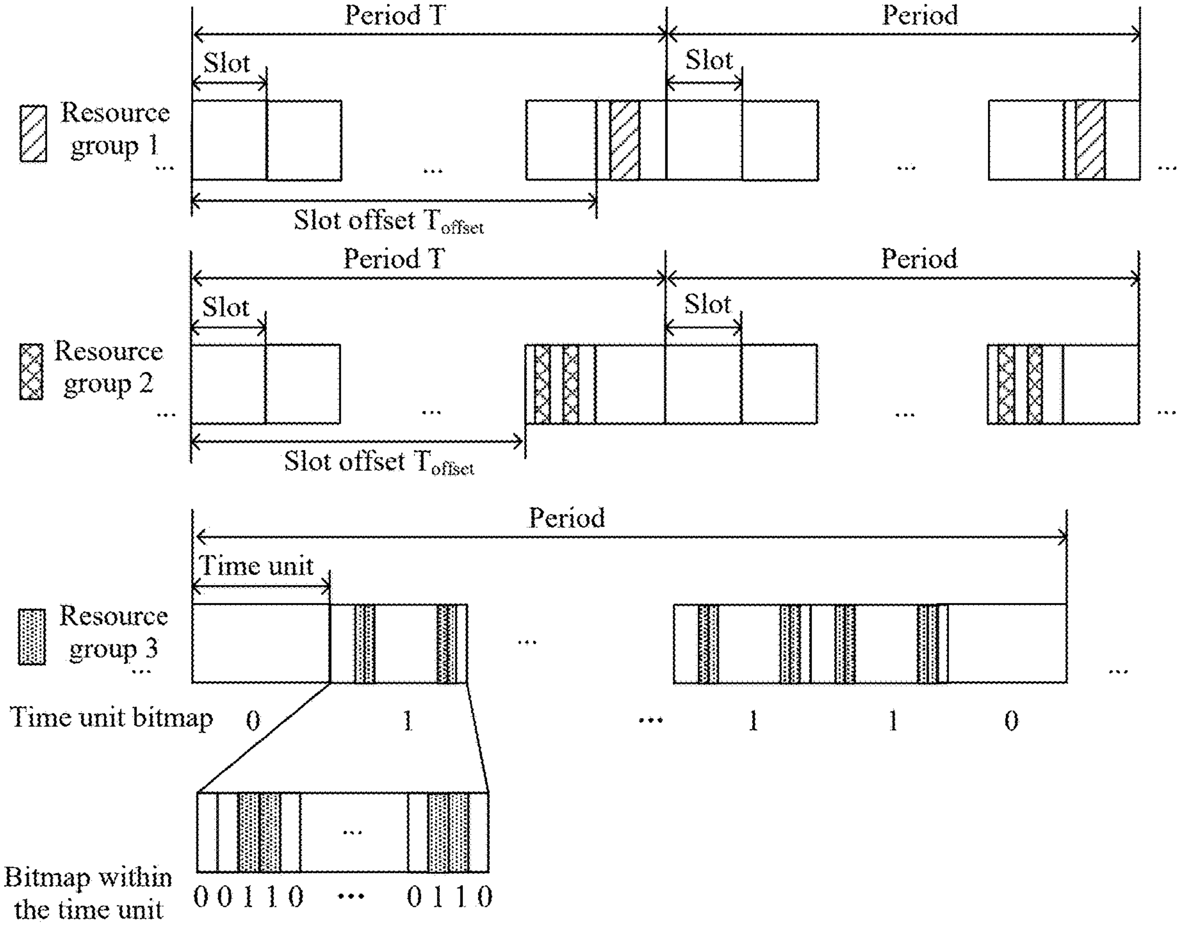
FIG. 8 is a schematic diagram of multiple resource groups according to an embodiment of the present disclosure.

In an embodiment, the resource group is a group of time domain resources which is periodic, and the time domain resources within one period include at least one of the following: a group of symbols, multiple groups of symbols, a group of time units, or multiple groups of time units. A group of symbols includes at least one symbol, and a group of time units includes at least one time unit. For example, FIG. 8 is a schematic diagram of multiple resource groups according to an embodiment of the present disclosure. For one resource group, the time domain resources within one period are a group of consecutive symbols (for example, resource group 1) or multiple groups of consecutive symbols (for example, resource group 2 and resource group 3) in the slot.

Figure 9:
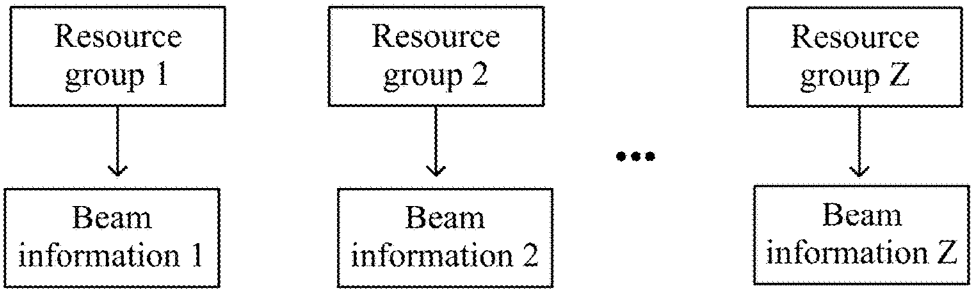
FIG. 9 is a schematic diagram illustrating the configuration of the correspondence between resource groups and beam information according to an embodiment of the present disclosure.

In an embodiment, the second configuration information further includes parameters related to resource group configuration for determining the resource group. The parameters related to the resource group configuration include at least one of the following: a resource group configuration period, a slot offset, or a symbol corresponding to the resource group in the slot. For example, resource group 1 and resource group 2 in FIG. 8 may be determined through the preceding parameters. A system frame $n_f$ and a slot $n_s$ where the resource in the resource group is located satisfy the following condition: $(N_s n_f+n_s-T_{offset}) \bmod T=0$, where $N_s$ denotes the number of slots included in the system frame, $n_f$ denotes the system frame number, $n_s$ denotes the slot number in the system frame, $T_{offset}$ denotes the slot offset, and T denotes the period corresponding to the resource group (in units of slots). After the slot in which the resource is located is determined, the resource group can be determined according to the symbol corresponding to the resource group in the slot. Alternatively, the parameters related to resource group configuration include at least one of the following: a resource group configuration period, a bitmap within the time unit, or a time unit bitmap. The bitmap within the time unit is configured to indicate the slot position, symbol position, or subframe position corresponding to the resource group within the time unit, and the time unit bitmap is configured to indicate in which time units in the resource configuration period the bitmap within the time unit appears. For example, for resource group 3 in FIG. 8, the bitmap 00110 . . . 0110 within the time unit indicates that the symbols corresponding to the resource group within the time unit are the third symbol, the fourth symbol, . . . , the second to last symbol, and the third to last symbol. The time unit bitmap 01 . . . 110 indicates that the bitmap within the time unit appears on the second time unit, . . . , the second to last time unit, and the third to last time unit in the resource configuration period, that is, the time units where the resource group is located are the second time unit, . . . , the second to last time unit, and the third to last time unit in the resource configuration period. The two resource group configuration manners in this embodiment are examples, and other manners may be adopted. The present disclosure does not impose any restrictions on the resource group configuration manner. Example two: using the resource group as the granularity to indicate the beam information The resource group is used as the granularity to indicate the beam information, that is, one resource group corresponds to one piece of beam information. FIG. 9 is a schematic diagram illustrating the configuration of the correspondence between resource groups and beam information according to an embodiment of the present disclosure. As shown in FIG. 9, one resource group corresponds to one piece of beam information, that is, the pieces of beam information corresponding to resource groups 1, 2, . . . , and Z are beam information 1, 2, . . . , and Z, respectively.

For the DL resource group, one DL resource group corresponds to one piece of beam information, and the beam information includes at least one of the DL transmit beam or the DL receive beam. For example, if the beam information corresponding to DL resource group 1 is DL transmit beam tx1, then the transmit beam the repeater determines to use on DL resource group 1 on the first link is beam tx1. For another example, if the beam information corresponding to DL resource group 1 is the DL receive beam rx1 and the DL transmit beam tx1, then the receive beam the repeater determines to use on DL resource group 1 on the second link is beam rx1, and the transmit beam the repeater determines to use on DL resource group 1 on the first link is beam tx1. Other DL resource groups are similar, and the details are not repeated here.

For the UL resource group, one UL resource group corresponds to one piece of beam information, and the beam information includes at least one of the UL transmit beam or the UL receive beam. For example, if the beam information corresponding to UL resource group 1 is UL receive beam rx2, then the receive beam the repeater determines to use on UL resource group 1 on the first link is beam rx2. For another example, if the beam information corresponding to UL resource group 1 is the UL receive beam rx2 and the UL transmit beam tx2, then the receive beam the repeater determines to use on UL resource group 1 on the first link is beam rx2, and the transmit beam the repeater determines to use on UL resource group 1 on the second link is beam tx2. Other UL resource groups are similar, and the details are not repeated here.

One resource group corresponds to one piece of beam information, and the beam information includes at least one of the following: the beam of the repeater on the first link, the beam of the repeater on the second link, or the transmit beam of the base station. For example, the beam information corresponding to resource group 1 is beam 1 of the repeater on the first link. If resource group 1 includes the DL symbol, the transmit beam the repeater determines to use on resource group 1 on the first link is beam 1. If resource group 1 includes the UL symbol, the receive beam the repeater determines to use on resource group 1 on the first link is beam 1. For another example, the beam information corresponding to resource group 1 is beam 2 of the repeater on the second link. If resource group 1 includes the DL symbol, the receive beam the repeater determines to use on resource group 1 on the second link is beam 2. If resource group 1 includes the UL symbol, the transmit beam the repeater determines to use on resource group 1 on the second link is beam 2.

In addition, if the beam information corresponding to the resource group is the transmit beam of the base station, the repeater determines the beam of the repeater on the second link according to the transmit beam of the base station, and then based on that the beam information is the beam of the repeater on the second link, the repeater determines the receive beam or the transmit beam used on the resource group on the second link.

Example three: the resource set is used as the granularity to indicate the beam information, and one resource set corresponds to one piece of beam information.

Figure 10:
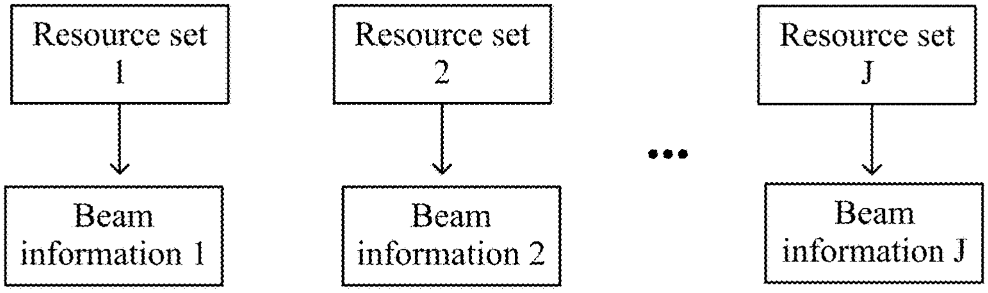
FIG. 10 is a schematic diagram illustrating the configuration of the correspondence between resource sets and beam information according to an embodiment of the present disclosure.

The resource set is used as the granularity to indicate the beam information, and all the resource groups in the resource set correspond to one piece of beam information. FIG. 10 is a schematic diagram illustrating the configuration of the correspondence between resource sets and beam information according to an embodiment of the present disclosure. As shown in FIG. 10, the resource sets are in one-to-one correspondence to pieces of beam information, that is, the pieces of beam information corresponding to resource sets 1, 2, . . . , and J are beam information 1, 2, . . . and J, respectively.

For the DL resource set formed by the DL resource groups, one DL resource set corresponds to one piece of beam information, and the beam information includes at least one of the DL transmit beam or the DL receive beam. For example, if the beam information corresponding to DL resource set 1 is DL transmit beam tx1, then the transmit beam the repeater determines to use on all the DL resource groups in DL resource set 1 on the first link is beam tx1. For another example, if the beam information corresponding to DL resource set 1 is the DL receive beam rx1 and the DL transmit beam tx1, then the receive beam the repeater determines to use on all the DL resource groups in DL resource set 1 on the second link is beam rx1, and the transmit beam the repeater determines to use on all the DL resource groups in DL resource set 1 on the first link is beam tx1. Other DL resource sets are similar, and the details are not repeated here.

For the UL resource set formed by the UL resource groups, one UL resource set corresponds to one piece of beam information, and the beam information includes at least one of the UL transmit beam or the UL receive beam. For example, if the beam information corresponding to UL resource set 1 is UL receive beam rx2, then the receive beam the repeater determines to use on all the UL resource groups in UL resource set 1 on the first link is beam rx2. For another example, if the beam information corresponding to UL resource set 1 is the UL receive beam rx2 and the UL transmit beam tx2, then the receive beam the repeater determines to use on all the UL resource groups in UL resource set 1 on the first link is beam rx2, and the transmit beam the repeater determines to use on all the UL resource groups in UL resource set 1 on the second link is beam tx2. Other UL resource sets are similar, and the details are not repeated here.

One resource set corresponds to one piece of beam information, and the beam information includes at least one of the following: the beam of the repeater on the first link, the beam of the repeater on the second link, or the transmit beam of the base station. All the resource groups in one resource set correspond to the same beam information. For example, the beam information corresponding to resource set 1 is beam 1 of the repeater on the first link. For the resource group including the DL symbol in resource set 1, the transmit beam the repeater determines to use on the resource group in resource set 1 on the first link is beam 1; and for the resource group including the UL symbol in resource set 1, the receive beam the repeater determines to use on the resource group in resource set 1 on the first link is beam 1. For another example, the beam information corresponding to resource set 1 is beam 2 of the repeater on the second link. For the resource group including the DL symbol in resource set 1, the receive beam the repeater determines to use on the resource group in resource set 1 on the second link is beam 2; and for the resource group including the UL symbol in resource set 1, the transmit beam the repeater determines to use on the resource group in resource set 1 on the second link is beam 2.

In addition, if the beam information corresponding to the resource set is the transmit beam of the base station, the repeater determines the beam of the repeater on the second link according to the transmit beam of the base station, and then based on that the beam information is the beam of the repeater on the second link, the repeater determines the receive beam or the transmit beam used on all the resource groups in the resource set on the second link.

Example four: the resource set is used as the granularity to indicate the beam information, and one resource group in the resource set corresponds to one piece of beam information.

Figure 11:
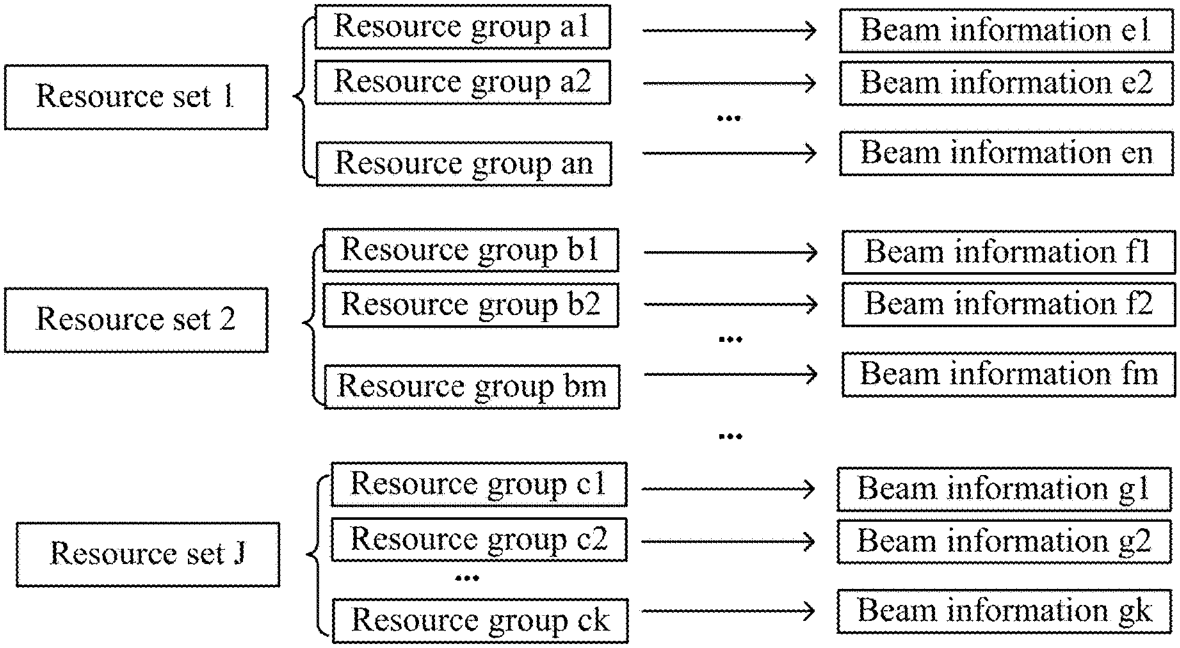
FIG. 11 is a schematic diagram illustrating the configuration of the correspondence between resource sets, resource groups, and beam information according to an embodiment of the present disclosure.

The resource set is used as the granularity to indicate the beam information, and one resource group in the resource set corresponds to one piece of beam information. FIG. 11 is a schematic diagram illustrating the configuration of the correspondence between resource sets, resource groups, and beam information according to an embodiment of the present disclosure. As shown in FIG. 11, the pieces of beam information corresponding to resource groups a1, a2, . . . , and an in resource set 1 are beam information e1, e2, . . . , and en, respectively; the pieces of beam information corresponding to resource groups b1, b2, . . . , and bm in resource set 2 are beam information f1, f2, . . . , and fm, respectively; . . . , the pieces of beam information corresponding to resource groups c1, c2, . . . , and ck in the resource set J are beam information g1, g2, . . . , and gk, respectively.

For the DL resource set formed by the DL resource groups, one DL resource group in the DL resource set corresponds to one piece of beam information, and the beam information includes at least one of the DL transmit beam or the DL receive beam. In an embodiment, for examples of beam information corresponding to the DL resource group, reference is made to the preceding examples, and the details are not repeated here.

For the UL resource set formed by the UL resource groups, one UL resource group in the UL resource set corresponds to one piece of beam information, and the beam information includes at least one of the UL transmit beam or the UL receive beam. In an embodiment, for examples of beam information corresponding to the UL resource group, reference is made to the preceding examples, and the details are not repeated here.

For one resource set, one resource group in the resource set corresponds to one piece of beam information, and the beam information includes at least one of the following: the beam of the repeater on the first link, the beam of the repeater on the second link, or the transmit beam of the base station. For examples of beam information corresponding to the resource group, reference is made to the preceding examples, and the details are not repeated here.

In an embodiment, the beam determination process is described by using the case where the beam usable by the first communication node is indicated by the list of combinations of beam information (that is, the configuration information is the third configuration information) as an example. In an embodiment, the case where the beam used by the repeater is determined by using the third configuration information may include three examples described below.

The repeater receives the third configuration information and according to the third configuration information, determines the beam used by the repeater in the time unit. The third configuration information includes at least one of the following: a time unit identifier and beam information corresponding to the time unit identifier; a combination of beam information; a list of combinations of beam information; or combination indication information. The combination of beam information indicates beam information corresponding to at least one time unit; the list of combinations of beam information includes at least one combination of beam information; one combination of beam information corresponds to one combination index; and the combination indication information is configured to indicate one combination index. The time unit identifier and beam information corresponding to the time unit identifier include at least one time unit and the beam information corresponding to each of the at least one time unit.

Each element of the combination of beam information indicates the beam information corresponding to one time unit according to the resource type or the link. For the case where the beam information corresponding to one time unit is indicated according to the resource type, the beam information includes at least one of the following: the DL transmit beam corresponding to the DL symbol, the DL receive beam corresponding to the DL symbol, the UL transmit beam corresponding to the UL symbol, or the UL receive beam corresponding to the UL symbol. For the case where the beam information corresponding to one time unit is indicated according to the link, the beam information includes at least one of the following: the beam of the repeater on the first link, the beam of the repeater on the second link, or the transmit beam of the base station.

In an embodiment, the third configuration information includes the time unit identifier and beam information corresponding to the time unit identifier. After the repeater receives the configuration information, according to the time unit identifier and the beam information corresponding to the time unit identifier, the repeater determines the beam used in the corresponding time unit.

In an embodiment, the third configuration information includes the combination of beam information. After the repeater receives the configuration information, according to the combination of beam information, the repeater determines the beam used in the corresponding time unit.

In an embodiment, the third configuration information includes the list of combinations of beam information and the combination indication information. The first signaling bears the list of combinations of beam information, and the second signaling bears the combination indication information. The repeater acquires the list of combinations of beam information through the first signaling, acquires one combination index through the second signaling, and acquires one combination of beam information in the list of combinations of beam information according to the combination index. In this manner, according to the combination of beam information, the repeater determines the beam used in the corresponding time unit.

In an embodiment, the third configuration information further includes an offset between a time unit in which the indication is valid and a time unit in which the signaling bearing the combination of beam information or the combination indication information is detected. For example, assuming that the signaling bearing the combination indication information is detected in time unit n, offset=0 means that validity starts from time unit n, and offset=k means that validity starts from time unit n+k.

In example one, the third configuration information includes the list of combinations of beam information.

The list of combinations of beam information includes at least one combination of beam information. Table 1 is a list of combinations of beam information according to an embodiment of the present disclosure. As described in Table 1, the list of combinations of beam information includes L+1 combinations of beam information. The combination of beam information corresponding to combination index 0 is (p00, p01, p02, . . . , p0r), the combination of beam information corresponding to combination index 1 is (p10, p11, p02, . . . , p1s), . . . , and the combination of beam information corresponding to combination index L is (pL0, pL1, pL2, . . . pLt).

Pij is an element of the combination of beam information and indicates the beam information corresponding to one time unit. For example, the combination of beam information corresponding to combination index 0 is (p00, p01, p02, . . . , p0r), and the combination of beam information indicates the beam information corresponding to r+1 time units in sequence.

TABLE 1

List of combinations of beam information

| Combination index | Combination of beam information |
|---|---|
| 0 | p00 p01 p02 . . . p0r |
| 1 | P10 p11 p12 . . . p1s |
| . . . | |
| L | pL0 pL1 pL2 . . . pLt |

In example two, each element of the combination of beam information indicates the beam information corresponding to one time unit according to the resource type.

Each element of the combination of beam information indicates the beam information corresponding to one time unit according to the resource type. The beam information includes at least one of the following: the DL transmit beam corresponding to the DL symbol, the DL receive beam corresponding to the DL symbol, the UL transmit beam corresponding to the UL symbol, or the UL receive beam corresponding to the UL symbol.

In an embodiment, the beam information includes at least one of the following: the DL transmit beam corresponding to the DL symbol or the UL receive beam corresponding to the UL symbol.

Figure 12:
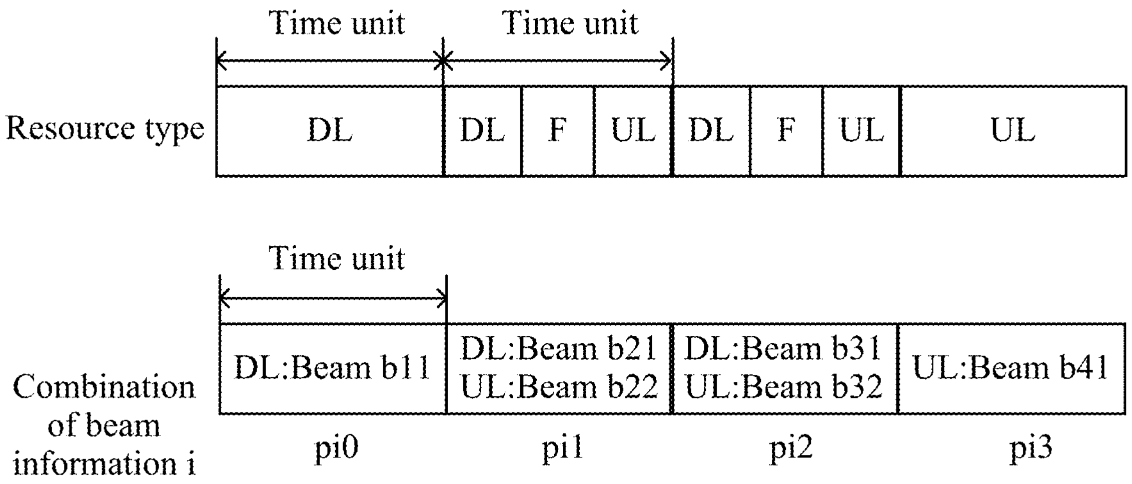
FIG. 12 is a schematic diagram illustrating that beam information corresponding to one time unit is indicated according to the resource type according to an embodiment of the present disclosure.

For example, FIG. 12 is a schematic diagram illustrating that beam information corresponding to one time unit is indicated according to the resource type according to an embodiment of the present disclosure. As shown in FIG. 12, the combination of beam information i is (pi0, pi1, pi2, pi3), where pi0 indicates that the DL transmit beam used in the corresponding time unit is beam b11; pi1 indicates that the DL transmit beam used in the corresponding time unit is beam b21 and the UL receive beam used in the corresponding time unit is b22; pi2 indicates that the DL transmit beam used in the corresponding time unit is beam b31 and the UL receive beam used in the corresponding time unit is b32; and pi3 indicates that the UL receive beam used in the corresponding time unit is b41.

In an embodiment, the beam information includes at least one of the following: the DL receive beam corresponding to the DL symbol or the UL transmit beam corresponding to the UL symbol.

In an embodiment, the beam information includes at least one of the following: the DL receive beam and the DL transmit beam corresponding to the DL symbol; or the UL receive beam and the UL transmit beam corresponding to the UL symbol.

In an embodiment, the DL receive beam includes one of the following: the receive beam of the repeater on the second link or the transmit beam of the base station. The UL transmit beam includes one of the following: the transmit beam of the repeater on the second link or the transmit beam of the base station. If the DL receive beam includes the transmit beam of the base station, the repeater determines the receive beam of the repeater on the second link according to the transmit beam of the base station. If the UL transmit beam includes the transmit beam of the base station, the repeater determines the transmit beam of the repeater on the second link according to the transmit beam of the base station.

In this example, for the meanings of the parameters in the beam information, reference is made to the preceding examples, and the details are not repeated here.

In example three, each element of the combination of beam information indicates the beam information corresponding to one time unit according to the link.

Each element of the combination of beam information indicates the beam information corresponding to one time unit according to the link. The beam information includes at least one of the following: the beam of the repeater on the first link, the beam of the repeater on the second link, or the transmit beam of the base station.

Figure 13:
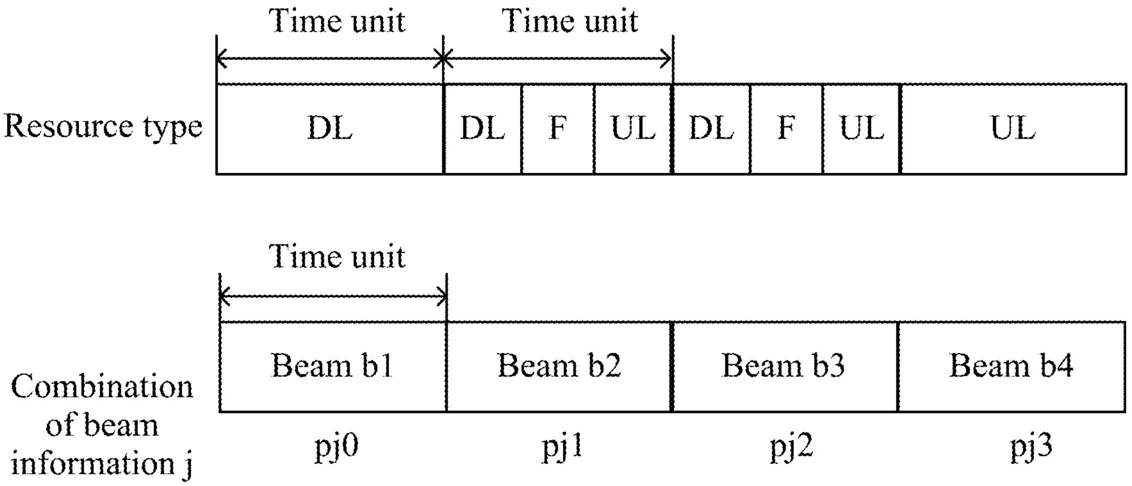
FIG. 13 is a schematic diagram illustrating that beam information corresponding to one time unit is indicated according to the link according to an embodiment of the present disclosure.

In an embodiment, the beam information includes the beam of the repeater on the first link. For example, FIG. 13 is a schematic diagram illustrating that beam information corresponding to one time unit is indicated according to the link according to an embodiment of the present disclosure. As shown in FIG. 13, the combination of beam information j is (pj0, pj1, pj2, pj3), where pj0 indicates that the DL transmit beam used in the corresponding time unit is beam b1; pj1 indicates that the DL transmit beam used in the corresponding time unit is beam b2 and the UL receive beam used in the corresponding time unit is also b2, that is, beam b2 is used as both the DL transmit beam and the uplink receive beam; pj2 indicates that the DL transmit beam used in the corresponding time unit is beam b3 and the UL receive beam used in the corresponding time unit is also b3; and pj3 indicates that the UL receive beam used in the corresponding time unit is b4.

In an embodiment, the beam information includes the beam of the repeater on the second link or the transmit beam of the base station.

In an embodiment, the beam information includes the beam of the repeater on the first link and the beam of the repeater on the second link.

In an embodiment, the beam information includes the beam of the repeater on the first link and the transmit beam of the base station.

In an embodiment, when the beam information includes the transmit beam of the base station, according to the transmit beam of the base station, the repeater determines the receive beam and the transmit beam used by the repeater on the second link.

In this example, for the meanings of the parameters in the beam information, reference is made to the preceding examples, and the details are not repeated here.

If there is no conflict, the preceding embodiments and examples may be combined in any combination or according to a certain priority. Some combined examples are given below.

In an embodiment, for one piece of time domain resource, if the second configuration information and the first configuration information indicate beam information corresponding to the time domain resource simultaneously, the beam information indicated by the first configuration information is covered or modified using the beam information indicated by the second configuration information.

In an embodiment, for one piece of time domain resource, if the first configuration information and the third configuration information indicate, for the same time resource, beam information corresponding to the first configuration information and beam information corresponding to the third configuration information respectively, the beam information indicated by the first configuration information is covered or modified using the beam information indicated by the third configuration information.

In an embodiment, for one piece of time domain resource, if the second configuration information and the third configuration information indicate beam information corresponding to the time domain resource simultaneously, the beam information indicated by the third configuration information is invalid, that is, the time domain resource uses the beam information indicated by the second configuration information.

In all the preceding embodiments and examples, for instance, the first configuration information further includes at least one of the following: the configuration period or a subcarrier spacing. The subcarrier spacing is used as a reference for the time unit, the slot, or the symbol. For example, if the first configuration information indicates that the subcarrier spacing is 15 kHz and the time unit is one or more slots, then the time unit is one or more slots corresponding to a subcarrier spacing of 15 kHz. For instance, the configuration period may be the same as the configuration period of the resource type by default. The subcarrier spacing may be the same as the subcarrier spacing corresponding to the resource type configuration by default.

In all the preceding embodiments and examples, for instance, the second configuration information further includes a resource group configuration parameter. The resource group configuration parameter includes at least one of the following: a resource group configuration period, a subcarrier spacing, a time unit offset, or a symbol corresponding to a resource group within a time unit.

In all the preceding embodiments and examples, for instance, the third configuration information further includes at least one of the following: a radio network temporary identity (RNTI) used for beam information indication, the payload size of indication signaling, a search space set for monitoring indication signaling, the position of a combination indication information field in indication signaling, a reference subcarrier spacing, or a time unit or a time unit list in which indication signal is applied.

The reference subcarrier spacing is used as a reference for the time unit, the slot, or the symbol; and the indication signaling includes signaling bearing the combination indication information.

In all the preceding embodiments and examples, for instance, the configuration information (including at least one of the first configuration information, the second configuration information, or the third configuration information) further includes at least one of the following: a cell identity, carrier configuration, or bandwidth part (BWP) configuration.

The drawings in all the preceding embodiments and examples are all for non-paired spectra. The same goes for paired spectra (that is, frequency-division duplex spectra). For example, on the same time domain resource, the configuration information indicates the beams corresponding to the DL and UL spectra; or the DL spectrum corresponds to one piece of configuration information, and the UL spectrum corresponds to one piece of configuration information.

If there is no conflict, the parameters of the configuration information in all the preceding embodiments and examples are configured separately. For example, when the first configuration information in example one and the first configuration information in example two are combined, the configuration information is the union of the configuration information in the two examples, and the parameters in the configuration information in the examples are configured separately. For example, the configuration periods in the examples may use different granularities and may be set to different values. Of course, when multiple examples are combined, it is not ruled out that parameters of the same type in the examples are combined. For example, the configuration periods in example one and example two have the same granularities and values, that is, the same configuration period parameter is used.

In all the preceding embodiments and examples, ordinal numbers such as "first", "second", "third", "fourth", and the like are used for distinguishing between different parameters. Of course, it is not ruled out that when multiple embodiments and examples are combined, the parameters in different embodiments and examples are unified into one parameter. In this case, the unified parameter is no longer distinguished by the ordinal number.

In all the preceding embodiments and examples, the configuration information (including at least one of the first configuration information, the second configuration information, or the third configuration information) is born by at least one signaling. For example, the configuration information that periodically indicates the beam information corresponding to the time unit is born by one signaling. For the configuration information that includes the resource group and the beam information corresponding to the resource group, all the configuration information is born by one signaling; alternatively, resource group-related information is born by one signaling (for example, signaling 1), and the beam information corresponding to the resource group is born by another signaling (for example. signaling 2). In addition, signaling 2 may be used as activation signaling to make the configuration information take effect. For another example, for the configuration information including the list of combinations of beam information and the combination indication information, the list of combinations of beam information is born by one signaling, and the combination indication information is born by another signaling. The present disclosure does not impose any restrictions on the signaling bearing the configuration information.

All descriptions in the present disclosure without specifically specifying the frequency domain range are for a component carrier (CC), a pair of CCs (for example, paired spectra), a frequency band, a cell, or a BWP. The present disclosure can be extended to multiple CCs, multiple pairs of CCs, multiple frequency bands, multiple cells, or multiple BWPs, as long as all the parameters in the configuration information are configured separately for each CC, each pair of CCs, each frequency band, each cell, or each BWP.

Figure 14:
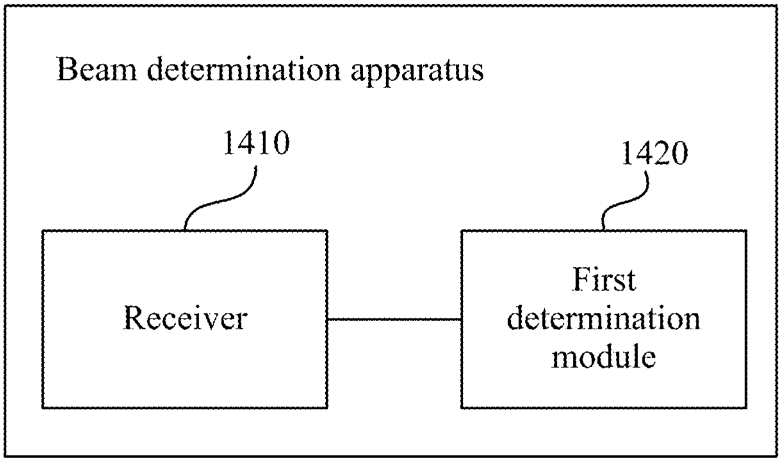
FIG. 14 is a block diagram of a beam determination apparatus according to an embodiment of the present disclosure.

In an embodiment, FIG. 14 is a block diagram of a beam determination apparatus according to an embodiment of the present disclosure. This embodiment is applied to a first communication node. For example, the first communication node is a smart repeater. As shown in FIG. 14, this embodiment includes a receiver 1410 and a first determination module 1420.

The receiver 1410 is configured to receive configuration information sent by a second communication node.

The first determination module 1420 is configured to determine a beam used by the first communication node according to the configuration information, where the configuration information includes at least one of the following: first configuration information, second configuration information, or third configuration information.

In an embodiment, the first configuration information includes beam information corresponding to each time unit within a configuration period.

In an embodiment, the beam information includes at least one of the following: a DL transmit beam corresponding to a DL symbol; a DL receive beam corresponding to a DL symbol; a UL transmit beam corresponding to a UL symbol; a UL receive beam corresponding to a UL symbol; a beam corresponding to an F symbol; or a transmit beam of the second communication node.

In an embodiment, for one time unit, the DL transmit beam corresponding to the DL symbol is configured to indicate a transmit beam used by the first communication node on a first link on the DL symbol within the time unit; for one time unit, the UL receive beam corresponding to the UL symbol is configured to indicate a receive beam used by the first communication node on the first link on the UL symbol within the time unit; for one time unit, the beam corresponding to the F symbol is configured to indicate at least one of the following: a DL transmit beam used by the first communication node on the first link on the F symbol within the time unit; a UL receive beam used by the first communication node on the first link on the F symbol within the time unit; a DL receive beam used by the first communication node on a second link on the F symbol within the time unit; or a UL transmit beam used by the first communication node on the second link on the F symbol within the time unit; for one time unit, the DL receive beam corresponding to the DL symbol is configured to indicate a receive beam used by the first communication node on the second link on the DL symbol within the time unit; for one time unit, the UL transmit beam corresponding to the UL symbol is configured to indicate a transmit beam used by the first communication node on the second link on the UL symbol within the time unit; and for one time unit, the transmit beam of the second communication node is configured to indicate a DL receive beam and/or a UL transmit beam used by the first communication node on the second link within the time unit.

In an embodiment, the beam corresponding to the F symbol includes at least one of the following: a first transmit and receive beam; the first transmit and receive beam and a first F symbol group corresponding to the first transmit and receive beam; first transmit and receive indication information; a DL transmit beam and a second F symbol group corresponding to the DL transmit beam; a UL receive beam and a third F symbol group corresponding to the UL receive beam; a second transmit and receive beam; the second transmit and receive beam and a fourth F symbol group corresponding to the second transmit and receive beam; second transmit and receive indication information; a DL receive beam and a fifth F symbol group corresponding to the DL receive beam; a UL transmit beam and a sixth F symbol group corresponding to the UL transmit beam; a third transmit and receive beam; the third transmit and receive beam and a seventh F symbol group corresponding to the third transmit and receive beam; uplink and downlink transmit and receive indication information; a DL transmit beam, a DL receive beam, and an eighth F symbol group corresponding to the DL transmit beam and the DL receive beam; or a UL transmit beam, a UL receive beam, and a ninth F symbol group corresponding to the UL transmit beam and the UL receive beam.

In an embodiment, the second configuration information includes a resource group and beam information corresponding to the resource group.

In an embodiment, one resource group corresponds to one piece of beam information, where the beam information includes at least one of the following: a DL transmit beam, a DL receive beam, a UL transmit beam, a UL receive beam, or a transmit beam of the second communication node.

In an embodiment, the beam information corresponding to the resource group meets at least one of the following: one resource group corresponds to one piece of beam information; or all resource groups in one resource set correspond to one piece of beam information.

In an embodiment, the third configuration information includes at least one of the following: a time unit identifier and beam information corresponding to the time unit identifier; a combination of beam information; a list of combinations of beam information; or combination indication information; where the combination of beam information indicates beam information corresponding to at least one time unit; the list of combinations of beam information includes at least one combination of beam information; and the combination indication information is configured to indicate a combination index.

In an embodiment, each tuple of the combination of beam information indicates beam information corresponding to one time unit according to a resource type or a link.

In an embodiment, the beam information corresponding to the one time unit is indicated according to the resource type, and the beam information includes at least one of the following: a DL receive beam; a DL transmit beam; a UL receive beam; or a UL transmit beam.

In an embodiment, the beam information corresponding to the one time unit is indicated according to the link, and the beam information includes at least one of the following: a beam of the first communication node on a first link; a beam of the first communication node on a second link; or a transmit beam of the second communication node.

In an embodiment, the third configuration information further includes an offset of a time unit in which an indication is valid relative to a time unit in which a signaling is detected, the signaling bearing the time unit identifier and the beam information corresponding to the time unit identifier, the combination of beam information, or the combination indication information.

In an embodiment, the configuration information includes the first configuration information and the second configuration information; and if the first configuration information and the second configuration information indicate, for the same time resource, beam information corresponding to the first configuration information and beam information corresponding to the second configuration information respectively, the beam information indicated by the first configuration information is covered or modified using the beam information indicated by the second configuration information.

In an embodiment, the configuration information includes the first configuration information and the third configuration information; and if the first configuration information and the third configuration information indicate, for the same time resource, beam information corresponding to the first configuration information and beam information corresponding to the third configuration information respectively, the beam information indicated by the first configuration information is covered or modified using the beam information indicated by the third configuration information.

In an embodiment, the DL receive beam includes one of the following: a receive beam of the first communication node on a second link or the transmit beam of the second communication node; the DL transmit beam includes a transmit beam of the first communication node on a first link; the UL receive beam includes a receive beam of the first communication node on the first link; and the UL transmit beam includes one of the following: a transmit beam of the first communication node on the second link or the transmit beam of the second communication node.

The beam determination apparatus provided in this embodiment is configured to implement the beam determination method applied to the first communication node in the embodiment shown in FIG. 2 and has similar implementation principles and technical effects, which are not repeated here.

Figure 15:
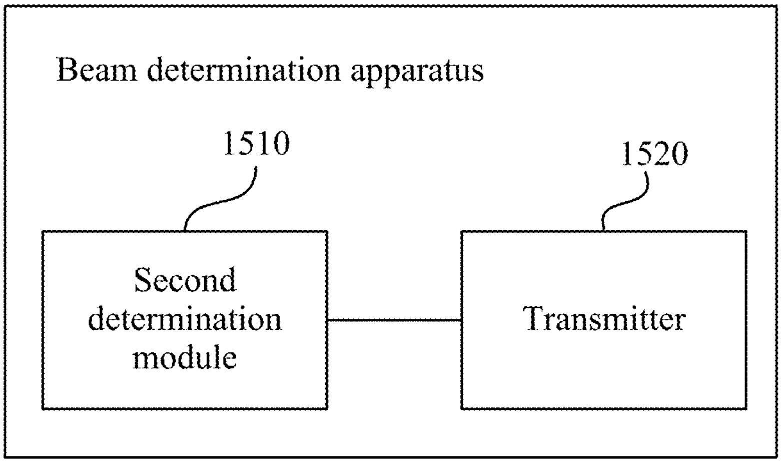
FIG. 15 is a block diagram of another beam determination apparatus according to an embodiment of the present disclosure.

In an embodiment, FIG. 15 is a block diagram of another beam determination apparatus according to an embodiment of the present disclosure. This embodiment is applied to the second communication node. For example, the second communication node may include a base station.

As shown in FIG. 15, the beam determination apparatus of this embodiment includes a second determination module 1510 and a transmitter 1520.

The second determination module 1510 is configured to determine configuration information. The transmitter 1520 is configured to send the configuration information to a first communication node so that according to the configuration information, the first communication node determines a beam to use, where the configuration information includes at least one of the following: first configuration information, second configuration information, or third configuration information.

In an embodiment, the first configuration information includes beam information corresponding to each time unit within a configuration period; or the first configuration information includes beam information corresponding to some time units within a configuration period.

In an embodiment, the beam information includes at least one of the following: a DL transmit beam corresponding to a DL symbol; a DL receive beam corresponding to a DL symbol; a UL transmit beam corresponding to a UL symbol; a UL receive beam corresponding to a UL symbol; a beam corresponding to an F symbol; or a transmit beam of the second communication node.

In an embodiment, for one time unit, the DL transmit beam corresponding to the DL symbol is configured to indicate a transmit beam used by the first communication node on a first link on the DL symbol within the time unit; for one time unit, the UL receive beam corresponding to the UL symbol is configured to indicate a receive beam used by the first communication node on the first link on the UL symbol within the time unit; for one time unit, the beam corresponding to the F symbol is configured to indicate at least one of the following: a DL transmit beam used by the first communication node on the first link on the F symbol within the time unit; a UL receive beam used by the first communication node on the first link on the F symbol within the time unit; a DL receive beam used by the first communication node on a second link on the F symbol within the time unit; or a UL transmit beam used by the first communication node on the second link on the F symbol within the time unit; for one time unit, the DL receive beam corresponding to the DL symbol is configured to indicate a receive beam used by the first communication node on the second link on the DL symbol within the time unit; for one time unit, the UL transmit beam corresponding to the UL symbol is configured to indicate a transmit beam used by the first communication node on the second link on the UL symbol within the time unit; and for one time unit, the transmit beam of the second communication node is configured to indicate a DL receive beam and/or a UL transmit beam used by the first communication node on the second link within the time unit.

In an embodiment, the beam corresponding to the F symbol includes at least one of the following: a first transmit and receive beam; the first transmit and receive beam and a first F symbol group corresponding to the first transmit and receive beam; first transmit and receive indication information; a DL transmit beam and a second F symbol group corresponding to the DL transmit beam; a UL receive beam and a third F symbol group corresponding to the UL receive beam; a second transmit and receive beam; the second transmit and receive beam and a fourth F symbol group corresponding to the second transmit and receive beam; second transmit and receive indication information; a DL receive beam and a fifth F symbol group corresponding to the DL receive beam; a UL transmit beam and a sixth F symbol group corresponding to the UL transmit beam; a third transmit and receive beam; the third transmit and receive beam and a seventh F symbol group corresponding to the third transmit and receive beam; uplink and downlink transmit and receive indication information; a DL transmit beam, a DL receive beam, and an eighth F symbol group corresponding to the DL transmit beam and the DL receive beam; or a UL transmit beam, a UL receive beam, and a ninth F symbol group corresponding to the UL transmit beam and the UL receive beam.

In an embodiment, the second configuration information includes a resource group and beam information corresponding to the resource group.

In an embodiment, one resource group corresponds to one piece of beam information, where the beam information includes at least one of the following: a DL transmit beam, a DL receive beam, a UL transmit beam, a UL receive beam, or a transmit beam of the second communication node.

In an embodiment, the beam information corresponding to the resource group meets at least one of the following: one resource group corresponds to one piece of beam information; or all resource groups in one resource set correspond to one piece of beam information.

In an embodiment, the third configuration information includes at least one of the following: a time unit identifier and beam information corresponding to the time unit identifier; a combination of beam information; a list of combinations of beam information; or combination indication information; where the combination of beam information indicates beam information corresponding to at least one time unit; the list of combinations of beam information includes at least one combination of beam information; and the combination indication information is configured to indicate a combination index.

In an embodiment, each tuple of the combination of beam information indicates beam information corresponding to one time unit according to a resource type or a link.

In an embodiment, the beam information corresponding to the one time unit is indicated according to the resource type, and the beam information includes at least one of the following: a DL receive beam; a DL transmit beam; a UL receive beam; or a UL transmit beam.

In an embodiment, the beam information corresponding to the one time unit is indicated according to the link, and the beam information includes at least one of the following: a beam of the first communication node on a first link; a beam of the first communication node on a second link; or a transmit beam of the second communication node.

In an embodiment, the third configuration information further includes an offset of a time unit in which an indication is valid relative to a time unit in which a signaling is detected, the signaling bearing the time unit identifier and the beam information corresponding to the time unit identifier, the combination of beam information, or the combination indication information.

In an embodiment, the configuration information includes the first configuration information and the second configuration information; and if the first configuration information and the second configuration information indicate, for the same time resource, beam information corresponding to the first configuration information and beam information corresponding to the second configuration information respectively, the beam information indicated by the first configuration information is covered or modified using the beam information indicated by the second configuration information.

In an embodiment, the configuration information includes the first configuration information and the third configuration information; and if the first configuration information and the third configuration information indicate, for the same time resource, beam information corresponding to the first configuration information and beam information corresponding to the third configuration information respectively, the beam information indicated by the first configuration information is covered or modified using the beam information indicated by the third configuration information.

In an embodiment, the DL receive beam includes one of the following: a receive beam of the first communication node on a second link or the transmit beam of the second communication node; the DL transmit beam includes a transmit beam of the first communication node on a first link; the UL receive beam includes a receive beam of the first communication node on the first link; and the UL transmit beam includes one of the following: a transmit beam of the first communication node on the second link or the transmit beam of the second communication node.

The beam determination apparatus provided in this embodiment is configured to implement the beam determination method applied to the second communication node in the embodiment shown in FIG. 3 and has similar implementation principles and technical effects, which are not repeated here.

Figure 16:
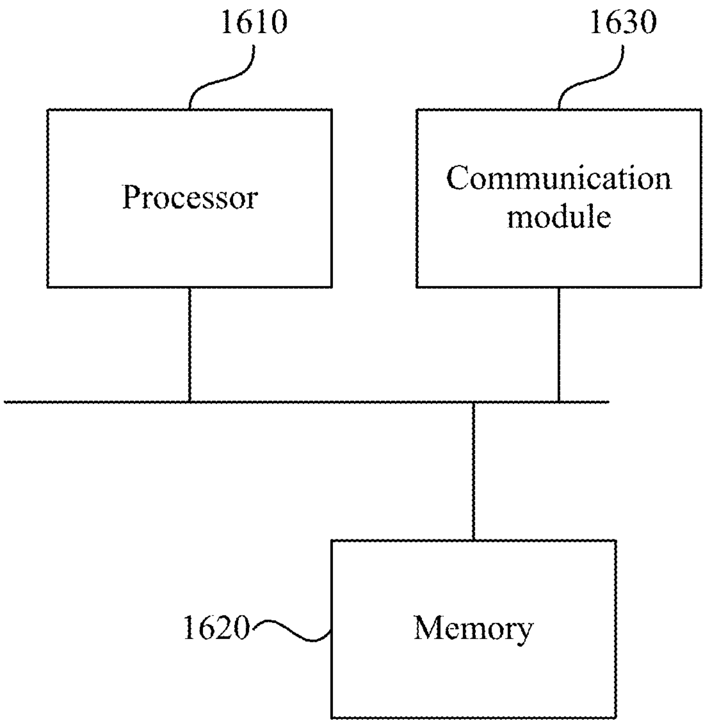
FIG. 16 is a structural diagram of a communication device according to an embodiment of the present disclosure.

In an embodiment, FIG. 16 is a structural diagram of a communication device according to an embodiment of the present disclosure. As shown in FIG. 16, the device provided in the present disclosure includes a processor 1610, a memory 1620, and a communication module 1630. One or more processors 1610 may be provided in the device, with one processor 1610 shown as an example in FIG. 16. One or more memories 1620 may be provided in the device, with one memory 1620 shown as an example in FIG. 16. The processor 1610, the memory 1620, and the communication module 1630 in the device may be connected via a bus or in other manners. FIG. 16 shows the connection via a bus as an example. In this embodiment, the device may be the first communication node. For example, the first communication node may be a smart repeater.

As a computer-readable storage medium, the memory 1620 may be configured to store software programs and computer-executable programs and modules, such as program instructions/modules (for example, the receiver 1410 and the first determination module 1420 in the beam determination apparatus) corresponding to the device according to any embodiment of the present disclosure. The memory 1620 may include a program storage region and a data storage region, where the program storage region may store an operating system and an application program required by at least one function, and the data storage region may store data created depending on the use of the device. Additionally, the memory 1620 may include a high-speed random-access memory and may also include a nonvolatile memory, such as at least one magnetic disk memory, a flash memory, or another nonvolatile solid-state memory. In some examples, the memory 1620 may include memories which are remotely disposed relative to the processor 1610, and these remote memories may be connected to the device via a network. Examples of the preceding network include, but are not limited to, the Internet, an intranet, a local area network, a mobile communication network, and a combination thereof.

The communication module 1630 is configured to perform a communicative interaction between the first communication node and the second communication node.

When the beam determination apparatus serves as the first communication node, the device provided above may be configured to perform the beam determination method applied to the first communication node in any preceding embodiment and has corresponding functions and effects.

When the beam determination apparatus serves as the second communication node, the device provided above may be configured to perform the beam determination method applied to the second communication node in any preceding embodiment and has corresponding functions and effects.

An embodiment of the present disclosure further provides a storage medium including a computer-executable instruction for performing a beam determination method applied to a first communication node when executed by a processor in a computer. This method includes receiving configuration information sent by a second communication node; and determining, according to the configuration information, a beam used by the first communication node, where the configuration information includes at least one of the following: first configuration information, second configuration information, or third configuration information.

An embodiment of the present disclosure further provides a storage medium including a computer-executable instruction for performing a beam determination method applied to a second communication node when executed by a processor in a computer. This method includes determining configuration information; and sending the configuration information to a first communication node so that the first communication node determines, according to the configuration information, a beam to use, where the configuration information includes at least one of the following: first configuration information, second configuration information, or third configuration information.

It is to be understood by those skilled in the art that the term "user equipment" encompasses any suitable type of wireless user equipment, for example, a mobile phone, a portable data processing apparatus, a portable web browser, or a vehicle-mounted mobile station.

Generally speaking, embodiments of the present disclosure may be implemented in hardware or special-purpose circuits, software, logic, or any combination thereof. For example, some aspects may be implemented in hardware while other aspects may be implemented in firmware or software executable by a controller, a microprocessor, or another computing apparatus, though the present disclosure is not limited thereto. The embodiments of the present disclosure may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present disclosure may represent program steps, may represent interconnected logic circuits, modules, and functions, or may represent a combination of program steps and logic circuits, modules, and functions. Computer programs may be stored in a memory. The memory may be of any type suitable for a local technical environment and may be implemented using any suitable data storage technology, such as, but not limited to, a read-only memory (ROM), a random-access memory (RAM) or an optical memory device and system (for example, a digital video disc (DVD) or a compact disc (CD)). The computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A beam determination method, the method being applied to a first communication node and comprising:

receiving configuration information sent by a second communication node; and determining, according to the configuration information, a beam used by the first communication node;

wherein the first communication node is a repeater, and the second communication node is a base station; wherein the configuration information comprises at least one resource set, a resource group, and beam information corresponding to the resource group, wherein each of the at least one resource set comprises the resource group, and one resource group corresponds to one piece of beam information; wherein the beam is used by the first communication node on a first link between the first communication node and a terminal; and wherein the one piece of beam information indicates one and the same beam, and the same beam is used by the first communication node on the first link both as a transmitting beam for transmission to the terminal and as a receiving beam for reception from the terminal.

2. A beam determination method, the method being applied to a second communication node and comprising:

determining configuration information; and sending the configuration information to a first communication node so that the first communication node determines, according to the configuration information, a beam to use, wherein the beam is used by the first communication node on a first link between the first communication node and a terminal;

wherein the configuration information comprises at least one resource set, a resource group, and beam information corresponding to the resource group, wherein each of the at least one resource set comprises the resource group, and one resource group corresponds to one piece of beam information; and wherein the one piece of beam information indicates one and the same beam, and the same beam is used by the first communication node on the first link both as a transmitting beam for transmission to the terminal and as a receiving beam for reception from the terminal; and wherein the first communication node is a repeater, and the second communication node is a base station.

3. A communication device, comprising a communication module, a memory, and at least one processor;

wherein the communication module is configured to perform a communicative interaction between a first communication node and a second communication node;

the memory is configured to store at least one program; and when executed by the at least one processor, the at least one program causes the at least one processor to perform:

receiving configuration information sent by the second communication node; and determining, according to the configuration information, a beam used by the first communication node;

wherein the first communication node is a repeater, and the second communication node is a base station; wherein the configuration information comprises at least one resource set, a resource group, and beam information corresponding to the resource group, wherein each of the at least one resource set comprises the resource group, and one resource group corresponds to one piece of beam information; wherein the beam is used by the first communication node on a first link between the first communication node and a terminal; and wherein the one piece of beam information indicates one and the same beam, and the same beam is used by the first communication node on the first link both as a transmitting beam for transmission to the terminal and as a receiving beam for reception from the terminal.

4. A non-transitory computer-readable storage medium, which is configured to store a computer program, wherein the computer program, when executed by a processor, causes the processor to perform the beam determination method of claim 1.

5. The method of claim 1, wherein the configuration information further comprises a resource group configuration parameter, and the resource group configuration parameter comprises at least one of the following: a resource group configuration period, a subcarrier spacing, a time unit offset, or a symbol corresponding to a resource group within a time unit.

6. The method of claim 2, wherein the configuration information further comprises a resource group configuration parameter, and the resource group configuration parameter comprises at least one of the following: a resource group configuration period, a subcarrier spacing, a time unit offset, or a symbol corresponding to a resource group within a time unit.

7. A communication device, comprising a communication module, a memory, and at least one processor;

wherein the communication module is configured to perform a communicative interaction between a first communication node and a second communication node;

the memory is configured to store at least one program; and when executed by the at least one processor, the at least one program causes the at least one processor to perform the beam determination method of claim 2.

8. A non-transitory computer-readable storage medium, which is configured to store a computer program, wherein the computer program, when executed by a processor, causes the processor to perform the beam determination method of claim 2.

* * * * *